United States Patent
Yu et al.

(10) Patent No.: US 12,468,300 B2
(45) Date of Patent: Nov. 11, 2025

(54) DETECTING NEGATIVE OBSTACLES

(71) Applicant: BOSTON DYNAMICS, INC., Waltham, MA (US)

(72) Inventors: Jeffrey Yu, Cambridge, MA (US); Benjamin John Swilling, Winchester, MA (US); Eric Cary Whitman, Arlington, MA (US)

(73) Assignee: BOSTON DYNAMICS, INC., Waltham, MA (US)

( * ) Notice: Subject to any disclaimer, the term of this patent is extended or adjusted under 35 U.S.C. 154(b) by 451 days.

(21) Appl. No.: 17/830,189

(22) Filed: Jun. 1, 2022

(65) Prior Publication Data
US 2022/0390952 A1     Dec. 8, 2022

Related U.S. Application Data

(60) Provisional application No. 63/202,283, filed on Jun. 4, 2021.

(51) Int. Cl.
*G05D 1/00*     (2024.01)
*B62D 57/032*   (2006.01)

(52) U.S. Cl.
CPC ......... *G05D 1/0214* (2013.01); *B62D 57/032* (2013.01); *G05D 1/0238* (2013.01); *G05D 1/0274* (2013.01)

(58) Field of Classification Search
CPC .. G05D 1/0214; G05D 1/0238; G05D 1/0274; B62D 57/032; B62D 57/02
See application file for complete search history.

(56) References Cited

U.S. PATENT DOCUMENTS 5,111,401 A * 5/1992 Everett, Jr. .......... G05D 1/0255
                                                        180/169
5,307,271 A * 4/1994 Everett, Jr. .............. B62D 1/28
                                                        180/169
(Continued)

FOREIGN PATENT DOCUMENTS

CA      2928262 A1   7/2012
CN    114499733 A    5/2011
(Continued)

OTHER PUBLICATIONS

Hines, Thomas et al., "Virtual surfaces and attitude aware planning and behaviours for negative navigation," IEEE Robotics and Automation Letters, Apr. 2021, vol. 6, No. 2, pp. 4048-4055.
(Continued)

*Primary Examiner* — Ian Jen
(74) *Attorney, Agent, or Firm* — Knobbe, Martens, Olson & Bear, LLP

(57) ABSTRACT

A computer-implemented method when executed by data processing hardware causes the data processing hardware to perform operations. The operations include detecting a candidate support surface at an elevation less than a current surface supporting a legged robot. A determination is made on whether the candidate support surface includes an area of missing terrain data within a portion of an environment surrounding the legged robot, where the area is large enough to receive a touchdown placement for a leg of the legged robot. If missing terrain data is determined, at least a portion of the area of missing terrain data is classified as a no-step region of the candidate support surface. The no-step region indicates a region where the legged robot should avoid touching down a leg of the legged robot.

28 Claims, 11 Drawing Sheets

(56) References Cited

U.S. PATENT DOCUMENTS

| | | | |
|---|---|---|---|
| 5,378,969 A * | 1/1995 | Haikawa | G05D 1/0246 180/8.1 |
| 7,211,980 B1 | 5/2007 | Bruemmer et al. | |
| 7,769,491 B2 * | 8/2010 | Fukuchi | G05D 1/0251 701/1 |
| 7,865,267 B2 | 1/2011 | Sabe et al. | |
| 7,912,583 B2 | 3/2011 | Gutmann et al. | |
| 8,270,730 B2 | 9/2012 | Watson | |
| 8,346,391 B1 | 1/2013 | Anhalt et al. | |
| 8,548,734 B2 | 10/2013 | Barbeau et al. | |
| 8,849,494 B1 | 9/2014 | Herbach et al. | |
| 8,930,058 B1 | 1/2015 | Quist et al. | |
| 9,352,470 B1 | 5/2016 | da Silva et al. | |
| 9,395,726 B1 | 7/2016 | Rizzi et al. | |
| 9,561,592 B1 | 2/2017 | Silva et al. | |
| 9,586,316 B1 | 3/2017 | Swilling | |
| 9,594,377 B1 | 3/2017 | Perkins et al. | |
| 9,717,387 B1 | 8/2017 | Szatmary et al. | |
| 9,789,607 B1 | 10/2017 | Whitman | |
| 9,868,210 B1 | 1/2018 | Whitman | |
| 9,908,240 B1 | 3/2018 | da Silva et al. | |
| 9,933,781 B1 | 4/2018 | Bando et al. | |
| 9,969,086 B1 | 5/2018 | Whitman | |
| 9,975,245 B1 | 5/2018 | Whitman | |
| 10,017,218 B1 | 7/2018 | Swilling et al. | |
| 10,059,392 B1 | 8/2018 | Fay et al. | |
| 10,081,098 B1 | 9/2018 | Nelson et al. | |
| 10,081,104 B1 | 9/2018 | Swilling | |
| 10,144,465 B1 | 12/2018 | Swilling et al. | |
| 10,196,104 B1 * | 2/2019 | Kagami | G06V 20/10 |
| 10,226,870 B1 | 3/2019 | Silva et al. | |
| 10,266,220 B2 | 4/2019 | Swilling et al. | |
| 10,399,621 B2 | 9/2019 | Swilling et al. | |
| 11,059,532 B1 | 7/2021 | Fay et al. | |
| 11,073,842 B1 | 7/2021 | Whitman et al. | |
| 11,123,869 B2 | 9/2021 | Whitman et al. | |
| 11,175,664 B1 | 11/2021 | Boyraz | |
| 11,268,816 B2 | 3/2022 | Fay et al. | |
| 11,287,826 B2 | 3/2022 | Whitman et al. | |
| 11,319,005 B2 | 5/2022 | Swilling et al. | |
| 11,383,381 B2 | 7/2022 | Whitman et al. | |
| 11,416,003 B2 | 8/2022 | Whitman et al. | |
| 11,447,195 B2 | 9/2022 | Whitman | |
| 11,465,281 B2 | 10/2022 | Whitman et al. | |
| 11,480,974 B2 | 10/2022 | Lee et al. | |
| 11,518,029 B2 | 12/2022 | Cantor et al. | |
| 11,548,151 B2 | 1/2023 | Whitman et al. | |
| 11,599,128 B2 * | 3/2023 | Whitman | G06V 10/44 |
| 11,660,752 B2 | 5/2023 | Whitman et al. | |
| 11,691,292 B2 | 7/2023 | Klingensmith et al. | |
| 11,712,802 B2 | 8/2023 | Chestnutt et al. | |
| 11,774,237 B2 | 10/2023 | Fay et al. | |
| 11,851,120 B2 | 12/2023 | Fay et al. | |
| 11,927,961 B2 | 3/2024 | Fay et al. | |
| 11,999,423 B2 | 6/2024 | Whitman | |
| 12,038,752 B1 * | 7/2024 | Blanton | G05D 1/0088 |
| 12,235,652 B2 | 2/2025 | Whitman et al. | |
| 2005/0131581 A1 | 6/2005 | Sabe et al. | |
| 2006/0025888 A1 | 2/2006 | Gutmann et al. | |
| 2006/0167621 A1 | 7/2006 | Dale | |
| 2007/0282564 A1 | 12/2007 | Sprague et al. | |
| 2008/0009966 A1 | 1/2008 | Bruemmer et al. | |
| 2008/0027590 A1 | 1/2008 | Phillips et al. | |
| 2008/0086241 A1 | 4/2008 | Phillips et al. | |
| 2009/0099689 A1 | 4/2009 | Takenaka et al. | |
| 2009/0125225 A1 | 5/2009 | Hussain et al. | |
| 2010/0066587 A1 | 3/2010 | Yamauchi et al. | |
| 2010/0172571 A1 | 7/2010 | Yoon et al. | |
| 2011/0172850 A1 | 7/2011 | Paz-Meidan et al. | |
| 2012/0089295 A1 | 4/2012 | Ahn et al. | |
| 2012/0182392 A1 | 7/2012 | Kearns et al. | |
| 2013/0141247 A1 | 6/2013 | Ricci | |
| 2013/0231779 A1 | 9/2013 | Purkayastha et al. | |
| 2013/0325244 A1 | 12/2013 | Wang et al. | |
| 2014/0188325 A1 | 7/2014 | Johnson et al. | |
| 2015/0158182 A1 | 6/2015 | Farlow et al. | |
| 2015/0253775 A1 * | 9/2015 | Jacobus | G01S 17/931 701/23 |
| 2015/0355638 A1 | 12/2015 | Field et al. | |
| 2015/0362921 A1 * | 12/2015 | Hanaoka | G05D 1/0274 702/159 |
| 2017/0131102 A1 | 5/2017 | Wirbel et al. | |
| 2017/0168488 A1 | 6/2017 | Wierzynski et al. | |
| 2017/0176990 A1 * | 6/2017 | Keller | G01S 17/42 |
| 2017/0197311 A1 | 7/2017 | Garcia et al. | |
| 2017/0203446 A1 | 7/2017 | Dooley et al. | |
| 2018/0173242 A1 | 6/2018 | Lalonde et al. | |
| 2018/0218513 A1 | 8/2018 | Ho | |
| 2018/0364717 A1 | 12/2018 | Douillard et al. | |
| 2019/0079523 A1 | 3/2019 | Zhu et al. | |
| 2019/0080463 A1 | 3/2019 | Davison et al. | |
| 2019/0100306 A1 | 4/2019 | Pohl et al. | |
| 2019/0138029 A1 | 5/2019 | Ryll et al. | |
| 2019/0171911 A1 | 6/2019 | Greenberg | |
| 2019/0187703 A1 | 6/2019 | Millard et al. | |
| 2019/0213896 A1 * | 7/2019 | Gohl | G06V 20/58 |
| 2019/0258737 A1 | 8/2019 | Wang et al. | |
| 2019/0318277 A1 | 10/2019 | Goldman et al. | |
| 2020/0117198 A1 * | 4/2020 | Whitman | G05D 1/247 |
| 2020/0117214 A1 * | 4/2020 | Jonak | G06T 7/13 |
| 2020/0192388 A1 | 6/2020 | Zhang et al. | |
| 2020/0249033 A1 | 8/2020 | Gelhar | |
| 2020/0333790 A1 | 10/2020 | Kobayashi et al. | |
| 2020/0409382 A1 | 12/2020 | Herman et al. | |
| 2021/0041243 A1 | 2/2021 | Fay et al. | |
| 2021/0041887 A1 * | 2/2021 | Whitman | B25J 13/089 |
| 2021/0141389 A1 | 5/2021 | Jonak et al. | |
| 2021/0147017 A1 | 5/2021 | Swilling et al. | |
| 2021/0158544 A1 | 5/2021 | Steinmeyer et al. | |
| 2021/0331754 A1 | 10/2021 | Whitman | |
| 2022/0024034 A1 | 1/2022 | Wei et al. | |
| 2022/0083062 A1 | 3/2022 | Jaquez et al. | |
| 2022/0137637 A1 | 5/2022 | Baldini et al. | |
| 2022/0155078 A1 | 5/2022 | Fay et al. | |
| 2022/0179420 A1 | 6/2022 | Whitman et al. | |
| 2022/0193898 A1 | 6/2022 | Aghasadeghi et al. | |
| 2022/0194245 A1 | 6/2022 | Gonano et al. | |
| 2022/0276654 A1 * | 9/2022 | Lee | G05D 1/0214 |
| 2022/0324104 A1 | 10/2022 | Whitman et al. | |
| 2022/0342421 A1 | 10/2022 | Kearns et al. | |
| 2022/0374024 A1 | 11/2022 | Whitman et al. | |
| 2022/0388170 A1 | 12/2022 | Merewether | |
| 2022/0390950 A1 | 12/2022 | Yamauchi | |
| 2022/0390954 A1 | 12/2022 | Klingensmith | |
| 2022/0410390 A1 | 12/2022 | Whitman et al. | |
| 2023/0008677 A1 | 1/2023 | Whitman et al. | |
| 2023/0143315 A1 | 5/2023 | Whitman et al. | |
| 2023/0234229 A1 | 7/2023 | Fay et al. | |
| 2023/0286167 A1 | 9/2023 | Klingensmith et al. | |
| 2023/0321830 A1 | 10/2023 | Fay et al. | |
| 2023/0400307 A1 | 12/2023 | Fay et al. | |
| 2023/0415343 A1 | 12/2023 | Whitman | |
| 2024/0075998 A1 | 3/2024 | Fay et al. | |
| 2024/0174310 A1 | 5/2024 | Whitman | |
| 2025/0155888 A1 | 5/2025 | Whitman et al. | |

FOREIGN PATENT DOCUMENTS

| | | |
|---|---|---|
| CN | 103413313 A | 11/2013 |
| CN | 203371557 | 1/2014 |
| CN | 106662646 A | 5/2017 |
| CN | 107169986 A | 9/2017 |
| CN | 108052103 | 5/2018 |
| CN | 111604916 | 9/2020 |
| CN | 211956515 | 11/2020 |
| CN | 112034861 | 12/2020 |
| CN | 113168184 | 7/2021 |
| CN | 113633219 | 11/2021 |
| CN | 114503043 A | 5/2022 |
| CN | 114234967 B | 10/2023 |
| JP | H02127180 A | 5/1990 |
| JP | H09134217 | 11/2003 |
| JP | 2005088189 | 4/2005 |
| JP | 2006011880 | 1/2006 |

(56) References Cited

FOREIGN PATENT DOCUMENTS

| | | |
|---|---|---|
| JP | 2006239844 | 9/2006 |
| JP | 2007041656 A | 2/2007 |
| JP | 2008072963 | 4/2008 |
| JP | 2009223628 | 10/2009 |
| JP | 2009271513 A | 11/2009 |
| JP | 2010253585 | 11/2010 |
| JP | 2013250795 | 12/2013 |
| JP | 2014123200 | 7/2014 |
| JP | 2014151370 | 8/2014 |
| JP | 2016081404 | 5/2016 |
| JP | 2016103158 | 6/2016 |
| JP | 2022504039 | 1/2022 |
| JP | 2022543997 A | 10/2022 |
| JP | 7219812 | 2/2023 |
| KR | 10-1121763 | 3/2012 |
| KR | 20120019893 A | 3/2012 |
| KR | 20130002834 A | 1/2013 |
| KR | 20180004151 A | 1/2018 |
| KR | 20220083666 A | 6/2022 |
| KR | 10-2023-0019497 | 2/2023 |
| KR | 10-2533690 | 5/2023 |
| KR | 102492242 | 6/2023 |
| WO | WO 2007/051972 | 5/2007 |
| WO | WO 2017/090108 | 6/2017 |
| WO | WO 2018231616 A1 | 12/2018 |
| WO | WO 2020/076418 | 4/2020 |
| WO | WO 2021/025708 A1 | 2/2021 |
| WO | WO 2022/256812 A1 | 12/2022 |

OTHER PUBLICATIONS

International Search Report and Written Opinion, mailed Sep. 28, 2022, for International Application No. PCT/US2022/072704, 17 pages.

M. Bajracharya, J. Ma, M. Malchano, A. Perkins, A. A. Rizzi and L. Matthies, "High fidelity day/night stereo mapping with vegetation and negative obstacle detection for vision-in-the-loop walking," 2013 IEEE/RSJ International Conference on Intelligent Robots and Systems, 2013, pp. 3663-3670.

H. Karunasekera, H. Zhang, T. Xi and H. Wang, "Stereo vision based negative obstacle detection," 2017 13th IEEE International Conference on Control & Automation (ICCA), 2017, pp. 834-838.

J. Larson et al., "Lidar based off-road negative obstacle detection and analysis," IEEE 14$^{th}$ Conference on Intelligent Transportation Systems, Washington, D.C., Oct. 5-7, 2011, 8 pages.

Abraham et al., "A Topological Approach of Path Planning for Autonomous Robot Navigation in Dynamic Environments", The 2009 IEEE/RSJ International Conference on Intelligent Robots and Systems, Oct. 11-15, 2009.

Alkautsar, "Topological Path Planning and Metric Path Planning", https://medium.com/@arifmaulanaa/topological-path-planning-and-metric-path-planning-5c0fa7f107f2, downloaded Feb. 13, 2023, 3 pages.

Boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.

Buchegger et al., "An Autonomous Vehicle for Parcel Delivery in Urban Areas" International Conference on Intelligent Transportation Systems (ITSC) Nov. 2018.

Cao, "Topological Path Planning For Crowd Navigation", https://www.ri.cmu.edu/app/uploads/2019/05/thesis.pdf, May 2019, 24 pages.

Collins et al. "Efficient Planning for High-Speed MAV Flight in Unknown Environments Using OnlineSparse Topological Graphs" IEEE International Conference on Robotics and Automation (ICRA) Aug. 2020.

Github.com, "cartographer-project/cartographer", https://github.com/cartographer-project/cartographer, downloaded Feb. 1, 2023, 4 pages.

Kuipers et al. "A Robot Exploration and Mapping Strategy Based on a Semantic Hierarchy of Spatial Representations" Journal of Robotics & Autonomous Systems vol. 8, 1991, pp. 47-63.

Fermin-Leon et al., "TIGRE: Topological Graph based Robotic Exploration", 2017 European Conference on Mobile Robots (ECMR), Paris, France, 2017, pp. 1-6.

McCammon et al., "Topological path planning for autonomous information gathering", Auton Robot 45, 821-842 (2021). https://doi.org/10.1007/s10514-021-10012-x.

Mendes et al., "ICP-based pose-graph SLAM", International Symposium on Safety, Security and Rescue Robotics (SSRR), Oct. 2016, Lausanne, Switzerland. pp. 195-200, ff10.1109/SSRR.2016.7784298, hal-01522248.

Poncela et al., "Efficient integration of metric and topological maps for directed exploration of unknown environments", Robotics and Autonomous Systems, Elsevier BV, Amsterdam, NL, vol. 41, No. 1, Oct. 31, 2002 (Oct. 31, 2002), p. 21-39.

Tang, "Introduction to Robotics", The Wayback Machine, https://web.archive.org/web/20160520085742/http://www.cpp.edu:80/~ftang/courses/CS521/, downloaded Feb. 3, 2023, 58 pages.

Thrun et al., "The GraphSLAM Algorithm with Applications to Large-Scale Mapping of Urban Structures", The International Journal of Robotics Research, vol. 25, No. 5-6, May-Jun. 2006, pp. 403-429.

Video game, "Unreal Engine 5", https://docs.unrealengine.com/5.0/en-US/basic-navigation-in-unreal-engine/, downloaded Feb. 1, 2023, 15 pages.

Whelan et al., "ElasticFusion: Dense SLAM Without A Pose Graph", http://www.roboticsproceedings.org/rss11/p01.pdf, downloaded Feb. 1, 2023, 9 pages.

Wikipedia.org, "Buffer (GIS)", http://wiki.gis.com/wiki/index.php/Buffer_(GIS)#:~:text=A%20'polygon%20buffer1%20is%20a,Buffer%20around%20line%20features, downloaded Feb. 1, 2023, 4 pages.

Wikipedia.org, "Probabilistic roadmap", https://en.wikipedia.org/wiki/Probabilistic_roadmap, downloaded Feb. 1, 2023, 2 pages.

Wikipedia.org, "Rapidly-exploring random tree", https://en.wikipedia.org/wiki/Rapidly-exploring_random_tree, downloaded Feb. 1, 2023, 7 pages.

Wikipedia.org, "Visibility graph", https://en.wikipedia.org/wiki/Visibility_graph, downloaded Feb. 1, 2023, 3 pages.

Yamauchi et al. "Place Recognition in Dynamic Environments" Journal of Robotic Systems, Special Issue on Mobile Robots, vol. 14, No. 2, Feb. 1997, pp. 107-120.

Yamauchi et al. "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, pp. 496-505.

International Search Report and Written Opinion, PCT/US2019/046646, Oct. 31, 2019, 13 pages.

International Search Report and Written Opinion, PCT/US/2019/051511, Jul. 1, 2020, 15 pages.

"AlphaDog Proto," video screen shots taken from https://www.youtube.com/watch?v=SSbZrQp-HOk, Sep. 29, 2011, downloaded Aug. 14, 2023, 24 pages.

"Atlas Update," video screen shots taken from https://www.youtube.com/watch?v=SD6Okylclb8, Oct. 3, 2013, downloaded Aug. 14, 2023, 18 pages.

"BigDog Overview (Updated Mar. 2010)," video screen shots taken from https://www.youtube.com/watch?v=cNZPRsrwumQ, Apr. 22, 2010, downloaded Aug. 14, 2023, 25 pages.

"BigDog Reflexes," video screen shots taken from https://www.youtube.com/watch?v=3gi6Ohnp9x8, Jan. 27, 2009, downloaded Aug. 14, 2023, 15 pages.

"Boston Dynamics BIGDOG Robot," video screen shots taken from https://www.youtube.com/watch?v=b2bExqhhWRI, Jul. 17, 2007, downloaded Oct. 5, 2023, 13 pages.

Boston Dynamics, "LS3—Legged Squad Support System," video screen shots taken from|https://www.youtube.com/watch?v=R7ezXBEBE6U&t=1s, Sep. 10, 2012, downloaded Feb. 2, 2024, 5 pages.

Boston Dynamics, "Introducing Spot Classic (previously Spot)," video screen shots taken from https://www.youtube.com/watch?v=M8YjvHYbZ9w, Feb. 9, 2015, downloaded Aug. 10, 2023, 14 pages.

(56) References Cited

OTHER PUBLICATIONS

Boston Dynamics, "Introducing Spot (Previously SpotMini)," video screen shots taken from https://www.youtube.com/watch?v=tf7IEVTDjng, Jun. 23, 2016, downloaded Jul. 31, 2023, 10 pages.

Boston Dynamics, "The New Spot," video screen shots taken from https://www.youtube.com/watch?v=kgaO45SyaO4, Nov. 13, 2017, downloaded Jul. 31, 2023, 3 pages.

Boston Dynamics, "Testing Robustness," video screen shots taken from https://www.youtube.com/watch?v=aFuA50H9uek, Feb. 20, 2018, downloaded Jul. 31, 2023, 3 pages.

Boston Dynamics, "Spot Autonomous Navigation," video screen shots taken from https://www.youtube.com/watch?v=Ve9kWX_KXus, May 10, 2018, downloaded Sep. 5, 2023, 11 pages.

Boston Dynamics, "SpotMini", The Wayback Machine, http://web.archive.org/web/20171118145237/https://bostondynamics.com/spot-mini, downloaded Jul. 31, 2023, 3 pages.

Lourenço et al., "A Volumetric Representation for Obstacle Detection in Vegetated Terrain," In 2014 IEEE International Conference on Robotics and Biomimetics (ROBIO 2014) Dec. 5, 2014 (pp. 283-290).

"PETMAN Prototype," video screen shots taken from https://www.youtube.com/watch?v=67CUudkjEG4, Oct. 26, 2009, downloaded Aug. 14, 2023, 10 pages.

"Petman," video screen shots taken from https://www.youtube.com/watch?v=mclbVTIYG8E, Oct. 30, 2011, downloaded Aug. 14, 2023, 12 pages.

Redacted Presentation from IAP Event at Massachusetts Institute of Technology, Jan. 31, 2018, 10 pages.

Stanford, "BigDog, the Rough-Terrain Robot," video screen shots taken from https://www.youtube.com/watch?v=-Bi-tPO0OPs, Aug. 27, 2010, downloaded Apr. 26, 2024, 12 pages.

Video embedded in PowerPoint Presentation for IAP Event at Massachusetts Institute of Technology on Jan. 31, 2018, video screen shots taken at 1 second intervals, 47 pages.

Curless, et al., "A Volumetric Method for Building Complex Models from Range Images," In Proceedings of the 23rd Annual Conference Comp Graph Inter Tech. Aug. 1, 1996 (pp. 303-312).

Github.com, "Volumetric TSDF Fusion of RGB-D Images in Python," https://github.com/andyzeng/tsdf-fusion-python?tab=readme-ov-file#readme, downloaded Jun. 17, 2025 (3 pages).

Kähler, et al., "Very High Frame Rate Volumetric Integration of Depth Images on Mobile Devices," IEEE Trans Visual Comp Graph. Jul. 23, 2015 (pp. 1241-1250).

Newcombe, et al., "KinectFusion: Real-time Dense Surface Mapping and Tracking," In 2011 10th IEEE Inter Symp Mixed Augm Reality, Oct. 26, 2011 (pp. 127-136).

Robots.ox.ac.uk, "InfiniTAM v3," https://www.robots.ox.ac.uk/~victor/infinitam/, downloaded Jun. 17, 2025 (2 pages).

Shotton, et al., "Scene Coordinate Regression Forests for Camera Relocalization in RGB-D Images," In Proceedings of the 2013 IEEE Conf Comp Vision and Pattern Recogni., 2013 (pp. 2930-2937).

Wooden, et al., "Autonomous Navigation for BigDog", In 2010 IEEE Inter Conf Robot Auto., May 3, 2010 (pp. 4736-4741).

International Search Report and Written Opinion dated Mar. 26, 2025, for International Application No. PCT/US2024/059844, 16 pages.

\* cited by examiner

DETECTING NEGATIVE OBSTACLES

CROSS REFERENCE TO RELATED APPLICATIONS

This application claims priority under 35 U.S.C. § 119(e) to U.S. Provisional Application 63/202,283, filed on Jun. 4, 2021. The disclosure of this prior application is considered part of the disclosure of this application and is hereby incorporated by reference in its entirety.

TECHNICAL FIELD

This disclosure relates to environment detection for mobile robots.

BACKGROUND

A robot is a reprogrammable and multifunctional manipulator designed to move material, parts, tools, or specialized devices through variable programmed motions for performance of tasks. Robots may be manipulators that are physically anchored (e.g., industrial robotic arms), mobile robots that move throughout an environment (e.g., legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles provides additional benefits to such industries.

SUMMARY

An aspect of the present disclosure provides a computer-implemented method that, when executed by data processing hardware causes the data processing hardware to perform operations. The operations include detecting a candidate support surface at an elevation less than a current surface supporting a legged robot. The operations include determining that the candidate support surface includes an area of missing terrain data within a portion of an environment surrounding the legged robot, where the area is large enough to receive a touchdown placement for a leg of the legged robot. The operations include generating a classification as a no-step region for at least a portion of the area of missing terrain data of the candidate support surface. The no-step region indicates a region where the legged robot should avoid touching down the leg of the legged robot.

In some implementations, detecting the candidate support surface at the elevation less than the current surface includes determining that a terrain mapping system of the legged robot has classified some portion of a terrain occlusion as a respective candidate support surface at the elevation less than the current surface supporting the legged robot. In some embodiments, generating the classification as the no-step region for the area of missing terrain data includes re-classifying the area of missing terrain data of the candidate support surface from a legal step region for the legged robot to the no-step region for the legged robot. In some examples, the operations further include generating a second classification as a second no-step region in a second area located on the surface currently supporting the legged robot. The second area is adjacent to the candidate support surface, which is at the elevation less than the current surface supporting the legged robot.

In some implementations, the area of missing terrain data defines a gap that extends from a first end adjacent the legged robot to a second end opposite the legged robot. In those implementations, the current surface supporting the legged robot extends across the gap defined by the area of missing terrain data from a first portion of the current surface supporting the legged robot to a second portion of the current surface supporting the legged robot. The second portion of the current surface is disposed on an opposite side of the gap from the legged robot. In further implementations, the operations further include generating a classification as a second no-step region in a second area located on the first portion of the current surface supporting the legged robot. The second area is adjacent to the first end of the gap. In those further implementations, the operations further include generating a third classification as a third no-step region in a third area located on the second portion of the current surface supporting the legged robot. The third area is adjacent to second end of the gap.

In some embodiments, the area of the missing terrain data spans a gap in the current surface. The gap has a width less than a stride length of the legged robot. In some examples, the legged robot includes a body and four legs coupled to the body.

In some implementations, determining that the candidate support surface includes the area of missing terrain data includes identifying that sensor data captured by one or more sensors associated with the legged robot fails to include sensor data for the area of missing terrain data of the candidate support surface. In further implementations, the one or more sensors are disposed on a body of the legged robot. In other further implementations, the one or more sensors are disposed on a front end portion of a body of the legged robot. The front end portion of the body faces in a direction of the candidate support surface while the legged robot traverses the environment. In additional further implementations, the one or more sensors are disposed on a rear end portion of a body of the legged robot. The rear end portion of the body faces in a direction of the candidate support surface while the legged robot traverses the environment. In other additional further implementations, the legged robot is traveling at a particular speed or gait and a field of view for the one or more sensors detecting the candidate support surface remains unchanged as the legged robot approaches and detects the candidate support surface at the elevation less than the current surface. In some examples, the touchdown placement is for a distal end of the legged robot.

Another aspect of the disclosure provides a robot that includes a body, two or more legs coupled to the body, and an obstacle detection system. The obstacle detection system is configured to detect and to classify a negative obstacle within an environment about the robot. The obstacle detection system includes data processing hardware and memory hardware in communication with the data processing hardware. The memory hardware stores instructions that when executed on the data processing hardware cause the data processing hardware to perform operations. The operations include detecting a candidate support surface at an elevation less than a current surface supporting at least one of the legs. The operations include determining that the candidate support surface includes an area of missing terrain data within a portion of the environment, where the area is large enough to receive a touchdown placement for one of the legs of the legged robot. The operations include generating a classification as a no-step region for the area of missing terrain data of the candidate support surface. The no-step region indicates a region where the robot should avoid touching down one of the legs of the legged robot.

In some implementations, detecting the candidate support surface at the elevation less than the current surface includes determining that a terrain mapping system of the robot has classified some portion of a terrain occlusion as a respective candidate support surface at the elevation less than the current surface supporting the at least one of the two or more legs. In some embodiments, generating the classification as the no-step region for the area of missing terrain data includes re-classifying the area of missing terrain data of the candidate support surface from a legal step region for the robot to the no-step region for the robot. In some examples, the operations further include generating a second classification as a second no-step region in a second area located on the current surface supporting the at least one of the two or more legs. The second area is adjacent to the candidate support surface, which is at the elevation less than the current surface supporting the at least one of the two or more legs.

In some implementations, the area of missing terrain information defines a gap that extends from a first end adjacent the robot to a second end opposite the robot. In those implementations, the current surface supporting the at least one of the two or more legs extends across the gap defined by the area of missing terrain data from a first portion of the current surface supporting the legged robot to a second portion of the current surface supporting the legged robot. The second portion of the current surface is disposed on an opposite side of the gap from the legged robot. In further implementations, the operations further include generating a second classification as a second no-step region in a second area located on a first portion of the current surface supporting the at least one of the two or more legs. The second area is adjacent to the first end of the gap. In those further implementations, the operations further include generating a third classification as a third no-step region in a third area located on a second portion of the current surface supporting the at least one of the two or more legs. The third area is adjacent to the second end of the gap.

In some embodiments, the area of missing terrain data spans a gap in the current surface. The gap has a width less than a stride length of the robot. In some examples, the two or more legs include four legs.

In some implementations, the robot further includes a sensor system that includes one or more sensors. In those implementations, determining that the candidate support surface includes the area of missing terrain data includes identifying that sensor data captured by one or more sensors fails to include sensor data for the area of missing terrain data of the candidate support surface. In further implementations, the one or more sensors are disposed on the body of the robot. In other further implementations, the one or more sensors are disposed on a front end portion of the body of the robot. The front end portion of the body faces in a direction of the candidate support surface while the robot traverses the environment. In additional further implementations, the one or more sensors are disposed on a rear end portion of the body of the robot. The rear end portion of the body faces in a direction of the candidate support surface while the robot traverses the environment. In additional other further implementations, the robot is traveling at a particular speed or gait and a field of view for the one or more sensors detecting the candidate support surface remains unchanged as the robot approaches and detects the candidate support surface at the elevation less than the current surface.

In some embodiments, detecting the candidate support surface occurs while the robot is traversing the environment. In some examples, each leg of the robot includes a distal end and the touchdown placement is for a respective distal end of a respective leg of the robot.

The details of the one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
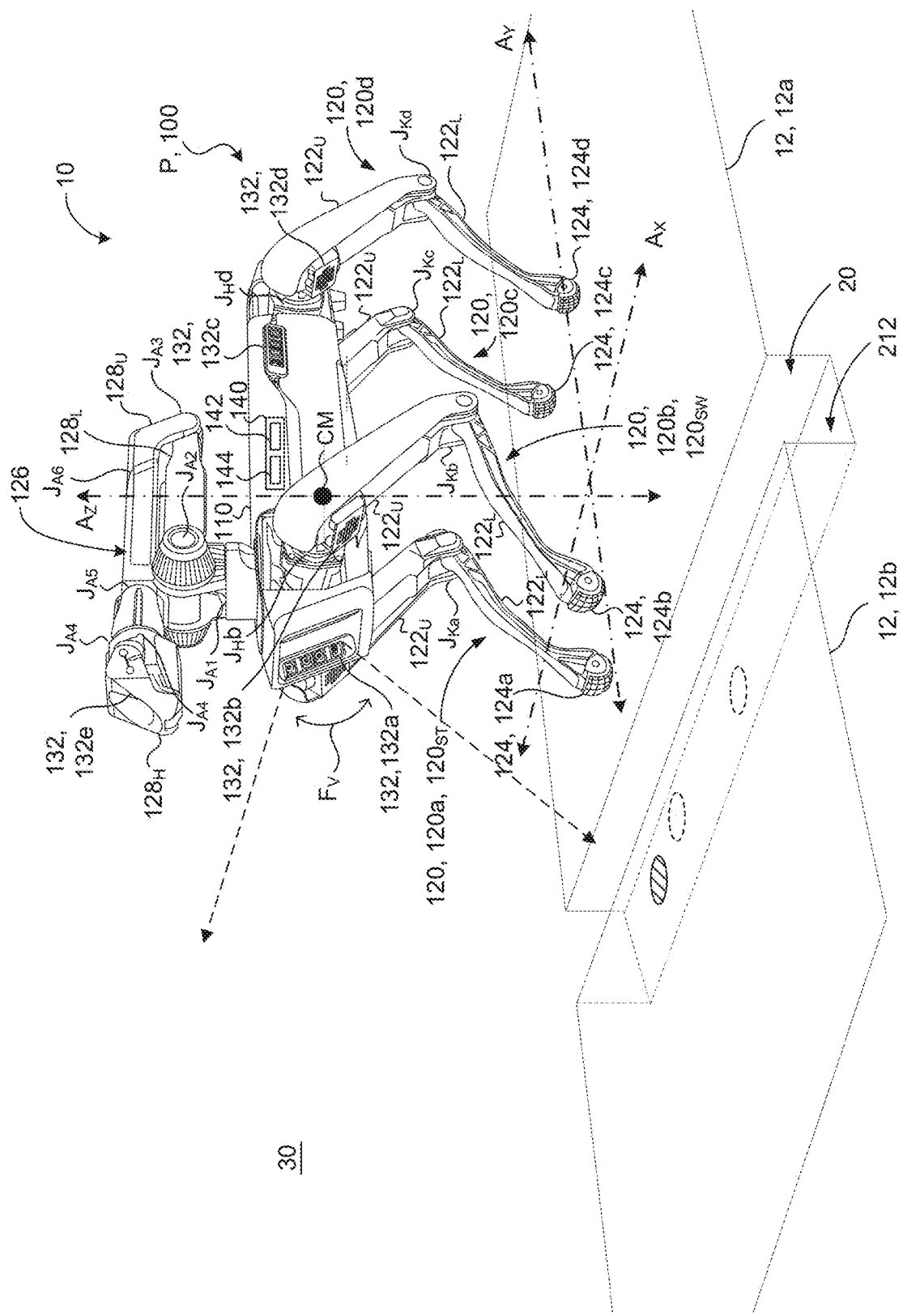
FIG. 1A is a perspective view of an example robot capable of performing negative obstacle detection.

As robots move about an environment, the performance of a robot may be at risk if the robot has stability issues. In the case of legged robots when compared to other non-legged robots, stability is generally a constant concern because the movement of the legged robot inherently subjects the robot to some degree of an unbalanced state. For example, swinging a leg towards a support surface (e.g., a ground surface) to touchdown causes a level of dynamic instability until the leg touches down at the touchdown placement location. In this respect, movement by a legged robot to traverse terrain already requires balancing efforts for the legged robot. If a legged robot's stability is influenced by another source, the other source may subject the robot to an unstable state from which the robot cannot recover or for which the robot cannot compensate. Here, when the robot cannot overcome this unstable state, the legged robot may trip, fall, or its mobility can be somehow inhibited. Unfortunately, if the mobility of the robot is tied to a particular task or mission for the legged robot, a situation that inhibits the robot's mobility may lead to failure for the task or mission. To further compound stability issues, when a robot trips or falls, a fall may damage some portion of the robot's environment, payload, or the robot itself. Such damage may also similarly compromise the ability of the robot to perform a task or mission.

Obstacles within an environment of the robot are one potential source of concern for the stability of the robot. An obstacle refers to an object that blocks or somehow hinders the robot's ability to traverse the space occupied by the object. Given the nature of an obstacle for the robot, colliding with an obstacle or even the act of avoiding an obstacle (e.g., without specialty obstacle avoidance systems) can detrimentally change the stability state for the robot. For these reasons, systems of a robot generally attempt to account for the potential obstacles within an environment for the robot. By accounting for potential obstacles, the robot may best avoid such obstacles, or help ensure that these obstacles do not have a negative impact on the behaviors of the robot (e.g., tasks and/or missions).

One issue that arises in obstacle detection is accurately detecting and classifying a negative obstacle. A negative obstacle refers to an obstacle that occurs due to a negative change in elevation for the robot. In some situations, the negative change in elevation is followed immediately by a positive change in elevation to form a trench-like negative obstacle. Some more particular examples of negative obstacles include depressions, cavities, trenches, ditches, potholes, pits, or a support surface where another potential support surface is visible beneath the current support surface (e.g., a floating platform). In contrast, a positive obstacle is an obstacle that extends some positive height from a surface supporting the positive obstacle. For instance, a chair is a positive obstacle because the combination of its legs, seat, and back offset the chair from its support surface. Positive obstacles may manifest in point cloud sensor data by perceiving points above a current support surface. In this respect, when the robot perceives these points above the support surface, the robot is aware there is an obstacle (i.e., a positive obstacle). On the other hand, negative obstacles manifest in point cloud sensor data by the robot failing to perceive points on the support surface; resulting in an area of missing terrain data. Missing terrain data may occur for several reasons including that the robot's sensor system did not sense a location or area that is missing terrain data, that the surface is difficult to perceive with sensor(s) (e.g., the surface is black, shiny, a sun spot, etc.), or that there is a negative obstacle present. Differentiating between situations poses challenges for systems of the robot that different from the challenges for positive obstacles. When a negative obstacle is present causing the area of missing terrain data, the area of missing terrain data commonly occurs due to a portion of the terrain being occluded from a sensor system and/or vision system of the robot. To illustrate, as a robot approaches a trench, a ledge (i.e., first side or end) of the trench nearest the robot may occlude the sensor system from perceiving the entire depth of the trench. Instead, due to the ledge nearest the robot, the line of sight for the sensor system may perceive some portion of the opposite ledge of the trench instead of the lowest point (i.e., the floor/bottom) in the trench. Based on this line of sight perception, the robot may believe that the lowest portion of the trench is falsely at a height greater than the actual lowest point in the trench. Given this false assumption, the robot may incorrectly determine that the bottom/floor of the trench is at a depth which the robot can step in and out of. Unfortunately though, if the robot places its leg into the trench, the leg may fall further than anticipated and disrupt the stability of the robot. That is, the robot may fall into the trench.

To address some of the issues posed by negative obstacles, the robot may deploy a negative obstacle detection system (e.g., the negative obstacle system 200). A negative obstacle detection system functions to review areas of missing terrain data and to understand the relationship of the area of missing terrain data with respect to nearby or adjacent terrain data that is not missing. By analyzing the relationship between the area of missing terrain data and the existing terrain data, the negative obstacle detection system can override or reclassify a region or area that is missing terrain data to designate whether the region should be a step region where the robot can safely touchdown its leg without causing future stability issues or a no-step region where the robot should avoid touching down its leg. To return to the previous example, the negative obstacle detection system would recognize that the robot is missing terrain data for the actual bottom surface or lowest point of the trench and determine that the area of missing terrain data should be a no-step region rather than a legal step region.

Figure 1B:
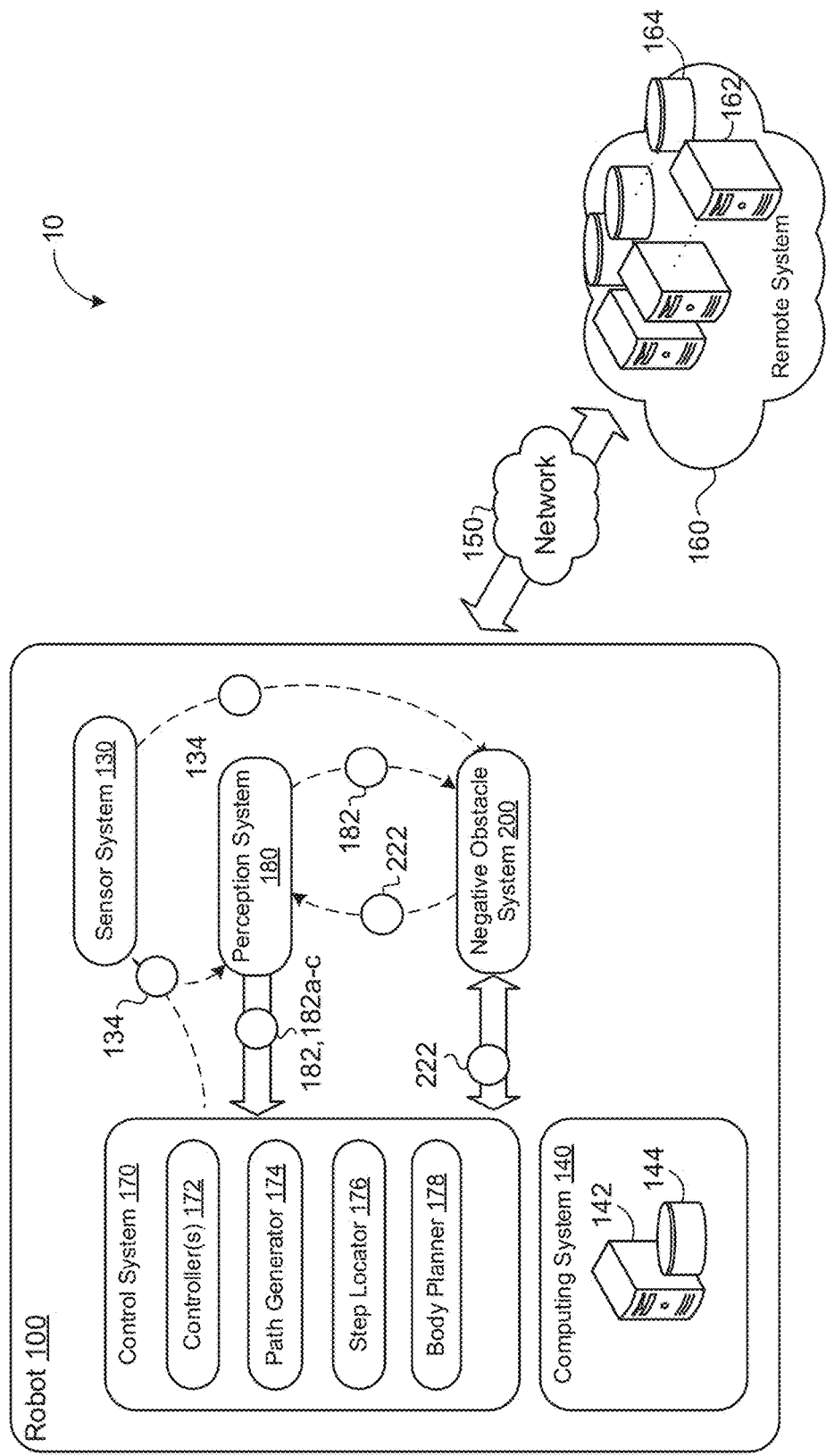
FIG. 1B is a schematic view of example systems of the robot of FIG. 1A.

Referring to FIGS. 1A and 1B, the robot 100 includes a body 110 with one or more locomotion-based structures such as legs 120a-d coupled to the body 110 that enable the robot 100 to move about an environment 30 that surrounds the robot 100. In some examples, each leg 120 is an articulable structure such that one or more joints J permit members 122 of the leg 120 to move. For instance, in the illustrated embodiment, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1A depicts a quadruped robot with four legs 120a-d, the robot 100 may include any number of legs or locomotive-based structures (e.g., a biped or humanoid robot with two legs, or other arrangements of one or more legs) that provide a means to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end of the leg includes an ankle joint such that the distal end is articulable with respect to the lower member of the leg.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (also referred to as an end-effector). Here, the lower member $128_L$ may rotate or pivot about one or more arm joints $J_A$ located adjacent to the body 110 (e.g., where the arm 126 connects to the body 110 of the robot 100). For example, FIG. 1 depicts the arm 126 able to rotate about a first arm joint $J_{A1}$, also referred to a yaw arm joint. With a yaw arm joint, the arm 126 is able to rotate in 360 degrees (or some portion thereof) axially about a vertical gravitational axis (e.g., shown as $A_Z$) of the robot 100. The lower member $128_L$ may pivot (e.g., while rotating) about a second arm joint $J_{A2}$. For instance, the second arm joint $J_{A2}$ (shown adjacent the body 110 of the robot 100 just above the first arm joint $J_{A1}$) allows the arm 126 to pitch to a particular angle with respect to the body or a horizontal plane (e.g., raising or lowering one or more members 128 of the arm 126). The lower member $128_L$ is coupled to the upper member $128_U$ at a third arm joint $J_{A3}$ and the upper member $128_U$ is coupled to the hand member $128_H$ at a fourth arm joint $J_{A4}$.

In some examples, such as FIG. 1A, the hand member $128_H$ (end-effector) is a mechanical gripper that includes a one or more moveable jaws configured to perform different types of grasping of elements within the environment 30. In the example shown, the end-effector $128_H$ includes a fixed first jaw and a moveable second jaw that grasps objects by clamping the object between the jaws. The moveable jaw is configured to move relative to the fixed jaw in order to move between an open position for the gripper and a closed position for the gripper (e.g., closed around an object).

In some implementations, the arm 126 may include additional joints $J_A$ such as the fifth arm joint $J_{A5}$ and/or the sixth arm joint $J_{A6}$. The fifth joint $J_{A5}$ may be located near the coupling of the upper member $128_U$ to the hand member $128_H$ and function to allow the hand member $128_H$ to twist or rotate relative to the lower member $128_U$. In other words, the fifth arm joint $J_{A4}$ may function as a twist joint similarly to the fourth arm joint $J_{A4}$ or wrist joint of the arm 126 adjacent the hand member $128_H$. For instance, as a twist joint, one member coupled at the joint J may move or rotate relative to another member coupled at the joint J (e.g., a first member portion coupled at the twist joint is fixed while the second member portion coupled at the twist joint rotates). Here, the fifth joint $J_{A5}$ may also enable the arm 126 to turn in a manner that rotates the hand member $128_H$ such that the hand member $128_H$ may yaw instead pitch. For instance, the fifth joint $J_{A5}$ allows the arm 126 to twist within a range of 180 degrees such that the jaws associated with the hand member $128_H$ may pitch, yaw, or some combination of both. This may be advantageous for hooking some portion of the arm 126 around objects or refining the how the hand member $128_H$ grasps an object. The sixth arm joint $J_{A6}$ may function similarly to the fifth arm joint $J_{A5}$ (e.g., as a twist joint). For example, the sixth arm joint $J_{A6}$ also allows a portion of an arm member 128 (e.g., the upper arm member $128_U$) to rotate or twist within a range of 180 degrees (e.g., with respect to another portion of the arm member 128 or another arm member 128). Here, a combination of the range of motion from the fifth arm joint $J_{A5}$ and the sixth arm joint $J_{A6}$ may enable a 360 degree rotation of the upper arm member $128_U$ with respect to the hand member $128_H$. In some implementations, the arm 126 connects to the robot 100 at a socket on the body 110 of the robot 100. In some configurations, the socket is configured as a connector such that the arm 126 may attach or detach from the robot 100 depending on whether the arm 126 is desired for particular operations. In some examples, the first and second arm joints $J_{A1,2}$ may be located at, adjacent to, or a portion of the socket that connects the arm 126 to the body 110.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). In general, the CM will depend at any moment on the presence/absence and positions of the arm 126 and legs 120. The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 30. Another anatomical plane of the robot 100 is the frontal plane that extends across the body 110 of the robot 100 (e.g., from a right side of the robot 100 with a first leg 120a to a left side of the robot 100 with a second leg 120b). The frontal plane spans the X-Z plane by extending in directions of the x-direction axis $A_X$ and the z-direction axis $A_Z$. In other words, the frontal plane bisects the robot 100 into a front portion and a rear portion. Here, the front portion of the robot 100 refers to the portion of the robot 100 with the front legs 120a-b while the rear portion of the robot 100 refers to the portion of the robot 100 with the hind legs 120c-d. Referring to FIG. 1A, when a leg 120 of the robot 100 is in a stance phase (e.g., the first leg 120a, $120_{ST}$), the leg 120 is generally bent at the knee joint $J_K$ (e.g., to support the load of the robot's body 110) such that the upper member $122_U$ of the leg 120 is at an angle less than 180 degrees with the lower member $122_L$ and the knee joint $J_K$ extends further towards the rear portion of the robot 100 than the hip joint $J_H$ that couples the upper member $122_U$ to the body 110 of the robot 100.

In order to maneuver about the environment 30 or to perform tasks using the arm 126, the robot 100 includes a sensor system 130 with one or more sensors 132, 132a-n. For instance, FIG. 1A illustrates a first sensor 132, 132a mounted at a head of the robot 100, a second sensor 132, 132b mounted near the hip of the second leg 120b of the robot 100, a third sensor 132, 132c corresponding one of the sensors 132 mounted on a side of the body 110 of the robot 100, a fourth sensor 132, 132d mounted near the hip of the fourth leg 120d of the robot 100, and a fifth sensor 132, 132e mounted at or near the end-effector $128_H$ of the arm 126 of the robot 100. The sensors 132 may include vision/image sensors, inertial sensors (e.g., an inertial measurement unit (IMU)), force sensors, and/or kinematic sensors. Some examples of sensors 132 include a camera such as a stereo camera, a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the first sensor 132, 132a of the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane). In some examples, multiple sensors 132 may be clustered together (e.g., similar to the first sensor 132a) to stitch a larger field of view $F_V$ than any single sensor 132. With multiple sensors 132 placed about the robot 100, the sensor system 130 may have a 360 degree view or a nearly 360 degree view of the surroundings of the robot 100 about vertical and/or horizontal axes.

When surveying a field of view $F_V$ with a sensor 132, the sensor system 130 (see, e.g., FIG. 1B) generates sensor data 134 (e.g., image data) corresponding to the field of view $F_V$. The sensor system 130 may generate the field of view $F_V$ with a sensor 132 mounted on or near the body 110 of the robot 100 (e.g., sensor(s) 132a, 132b, 132c). The sensor system may additionally and/or alternatively generate the field of view $F_V$ with a sensor 132 mounted at or near the end-effector $128_H$ of the arm 126 (e.g., sensor(s) 132e). The one or more sensors 132 may capture sensor data 134 that defines the three-dimensional point cloud for the area within the environment 30 about the robot 100. In some examples, the sensor data 134 is image data that corresponds to a three-dimensional volumetric point cloud generated by a three-dimensional volumetric image sensor 132. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132b-d). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $126_H$ relative to another member of the arm 126 or robot 100), joint speed, joint angular velocity, joint angular acceleration, and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 or 128 coupled at a joint J) and systems of the robot 100 perform further processing to derive velocity and/or acceleration from the positional data. In other examples, a sensor 132 is configured to measure velocity and/or acceleration directly.

With reference to FIG. 1B, as the sensor system 130 gathers sensor data 134, a computing system 140 stores, processes, and/or communicates the sensor data 134 to various systems of the robot 100 (e.g., the computing system 140, the control system 170, the perception system 180, and/or the navigation system 200). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement-based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources, such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170 and a perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order to perform controlled actions for the robot 100, such as moving the robot 100 about the environment 30. In some examples, by having the perception system 180 separate from, yet in communication with the control system 170, processing for the control system 170 may focus on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in the environment 30.

A given controller 172 of the control system 170 may control the robot 100 by controlling movement about one or more joints J of the robot 100. In some configurations, the given controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 122, 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform some movements, a controller 172 may be configured to control movement of multiple parts of the robot 100 such as, for example, two legs 120a-b, four legs 120a-d, the arm 126, or any combination of legs 120 and/or arm 126 (e.g., two or four legs 120 combined with the arm 126). In some examples, a controller 172 is configured as an object-based controller that is set up to perform a particular behavior or set of behaviors for interacting with an interactable object.

In some examples, the control system 170 includes at least one controller 172, a path generator 174, a step locator 176, and a body planner 178. The control system 170 may be configured to communicate with at least one sensor system 130 and any other system of the robot 100 (e.g., the perception system 180 and/or the negative obstacle system 200). The control system 170 performs operations and other functions using the computing system 140. The controller 172 is configured to control movement of the robot 100 to traverse about the environment 30 based on input or feedback from the systems of the robot 100 (e.g., the sensor system 130, the perception system 180, and/or the negative obstacle system 200). This may include movement between poses and/or behaviors of the robot 100. For example, the controller 172 controls different footstep patterns, leg patterns, body movement patterns, or vision system-sensing patterns.

In some implementations, the control system 170 includes specialty controllers 172 that are dedicated to a particular control purpose. These specialty controllers 172 may include specialty controllers, such as but not limited to the illustrated path generator 174, step locator 176, and/or body planner 178. Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis AZ) of the robot 100. The path generator 174 functions by identifying obstacles within the environment 30 about the robot 100 (e.g., based on the perceptions maps 182 and/or information from the negative obstacle system 200). The path generator 174 communicates the obstacles to the step locator 176 such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perception system 180 (e.g., map(s) 182). The body planner 178, much like the step locator 176, receives inputs from the perception system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 30.

The perception system 180 is a system of the robot 100 that helps the robot 100 to move more precisely in a terrain with various obstacles. The perception system 180 may include elements described in, Constrained Mobility Mapping, patent application Ser. No. 16/573,284, which is hereby incorporate by reference, and may additionally be considered to include the negative obstacle system 200 described herein. As the sensors 132 collect sensor data 134 for the space about the robot 100 (i.e., the robot's environment 30), the perception system 180 uses the sensor data 134 to form one or more perception maps 182 for the environment 30. Once the perception system 180 generates a perception map 182, the perception system 180 is also configured to add information to the perception map 182 (e.g., by projecting sensor data 134 on a preexisting map) and/or to remove information from the perception map 182.

In some examples, the one or more perceptions maps 182 generated by the perception system 180 are a ground height map 182, 182a, a no step map 182, 182b, and/or a body obstacle map 182, 182c. The ground height map 182a refers to a perception map 182 generated by the perception system 180 based on spatial occupancy of an area (e.g., the environment 30) divided into three-dimensional volume units (e.g., voxels from a voxel map). In some implementations, the ground height map 182a functions such that, at each X-Y location within a grid of the map 182 (e.g., designated as a cell of the ground height map 182a), the ground height map 182a specifies a height. In other words, the ground height map 182a conveys that, at a particular X-Y location in a horizontal plane, the robot 100 should step at a certain height.

The no step map 182b generally refers to a perception map 182 that defines regions where the robot 100 is not allowed to step in order to advise the robot 100 when the robot 100 may step at a particular horizontal location (i.e., location in the X-Y plane). In some examples, much like the body obstacle map 182c and the ground height map 182a, the no step map 182b is partitioned into a grid of cells where each cell represents a particular area in the environment 30 about the robot 100. For instance, each cell can be a three centimeter square. For ease of explanation, each cell exists within an X-Y plane within the environment 30. When the perception system 180 generates the no-step map 182b, the perception system 180 may generate a Boolean value map where the Boolean value map identifies no step regions and step regions. A no step region refers to a region of one or more cells where an obstacle exists while a step region refers to a region of one or more cells where an obstacle is not perceived to exist. The perception system 180 may further process the Boolean value map such that the no step map 182b includes a signed-distance field. Here, the signed-distance field for the no step map 182b includes a distance to a boundary of an obstacle (e.g., a distance to a boundary of the no step region) and a vector v (e.g., defining nearest direction to the boundary of the no step region) to the boundary of an obstacle.

The body obstacle map 182c generally determines whether the body 110 of the robot 100 may overlap a location in the X-Y plane with respect to the robot 100. In other words, the body obstacle map 182c identifies obstacles for the robot 100 to indicate whether the robot 100, by overlapping at a location in the environment 30, risks collision or potential damage with obstacles near or at the same location. As a map of obstacles for the body 110 of the robot 100, systems of the robot 100 (e.g., the control system 170) may use the body obstacle map 182c to identify boundaries adjacent, or nearest to, the robot 100 as well as to identify directions (e.g., an optimal direction) to move the robot 100 in order to avoid an obstacle. In some examples, much like other perception maps 182, the perception system 180 generates the body obstacle map 182c according to a grid of cells (e.g., a grid of the X-Y plane). Here, each cell within the body obstacle map 182c includes a distance from an obstacle and a vector pointing to the closest cell that is an obstacle (i.e., a boundary of the obstacle).

Referring further to FIG. 1B, the robot 100 also includes a negative obstacle system 200. The negative obstacle system 200 is a system of the robot 100 that functions to identify a negative obstacle 20 (FIGS. 1A, 2B-2G) based on sensor data 134 from the sensor system 130 and to generate a classification 222 for the negative obstacle 20 (e.g., a classification 222 of a no-step region 222, 222NS or a step region 222, 222S). In some examples, the negative obstacle system 200 provides feedback to the perception system 180, or may be considered a subsystem of the perception system 180. The perception system 180 may receive the classification 222 from the negative obstacle system 200 as feedback and update or modify one or more maps 182 to reflect these classifications 222. For instance, the negative obstacle system 200 informs the no step map 182b of its classification 222 of a negative obstacle 20. If a map 182, such as the no step map 182b, already includes a no-step/step classification for the area corresponding to a no-step region 222NS from the negative obstacle system 200, the classification 222 may confirm or reclassify the existing step/no-step classification of the map 182. In some implementations, the negative obstacle system 200 is integrated with or considered part of the perception system 180. In this sense, the maps 182 may be formed in conjunction with the functionality of the negative obstacle system 200. Additionally or alternatively, the negative obstacle system 200 may directly feed its classification 222 of a negative obstacle 20 to the control system 170 (e.g., to the path generator 174). In this respect, the control system 170 may be configured to prioritize a classification received from the negative obstacle system 200 over another classification from another system (e.g., the perception system 180) for the same area. The classification 222 output from negative obstacle system 200 may take precedence because the negative obstacle system 200 includes a system specifically designed for negative obstacles 20 and, for at least this reason, is likely more accurate than another systems not designed for the special purpose of identifying negative obstacles 20.

Referring to FIGS. 2A-2G, the negative obstacle system 200 includes a detector 210 and a classifier 220. As the robot 100 moves about the environment 30, the detector 210 is configured to detect a candidate support surface 212 at an elevation less than a current surface 12 supporting the robot 100. The candidate support surface 212 is only a candidate initially, as further analysis may change the position of the candidate support surface 212 or identify it as a negative obstacle 20, as will be understood from the description below. In some configurations, the detector 210 detects a candidate support surface 212 by identifying terrain occlusions in the sensor data 134 from the sensor system 130. A terrain occlusion generally refers to an area A in the sensor data 134 that is without sensor data 134. In other words, a terrain occlusion is associated with an area in the environment 30 that is missing terrain data. This area of missing terrain data may be an indicator of the presence of a negative obstacle 20 because, in the case of a negative obstacle 20, some portion of the negative obstacle 20 (e.g., a wall of negative obstacle 20) together with the robot position and field-of-view of the robot sensor(s) 132 causes an occlusion that prevents the sensor system 130 from gathering sensor data 134 for a particular area. To identify a terrain occlusion, the detector 210 may receive sensor data 134 and analyze the sensor data 134 for a depth discontinuity 214 (see FIG. 2B). A depth discontinuity 214 may occur when there is a cluster of sensor data 134 (e.g., depth sensor data) in a first plane 13 defined by a current surface 12 that is in contact with a distal end 124 of a leg 120 of the robot 100 followed by some degree of sensor data 134 in a second plane lower in elevation than the first plane. Here, when this depth discontinuity 214 exists, the detector 210 identifies the second plane as a candidate support surface 212.

In some examples, rather than parsing the sensor data 134 on its own accord, the detector 210 may identify the candidate support surface 212 by leveraging other terrain mapping systems (e.g., the perception system 180) of the robot 100. For instance, as previously stated, a perception map 182 such as the ground height map 182a may include a voxel map with a grid where each cell within the voxel map grid that includes one or more voxels also specifies the approximate height for the one or more voxels in that particular cell. In this respect, such a map 182 may also indicate that a depth discontinuity 214 exists due to a difference in ground heights for adjacent portions of the map 182. For example, in a voxel-based map such as the ground height map 182a, the ground height map 182a would indicate a ground height for cells supporting the robot 100, then include cells without height data (e.g., due to missing terrain data), and then followed by cells having a ground height less than the cells supporting the robot 100. When a perception map 182 indicates a depth discontinuity 214, the detector 210 is configured to determine that a candidate support surface 212 is present where this depth discontinuity 214 occurs.

FIGS. 2B-2G depict two different examples of negative obstacles 20 and how the negative obstacle system 200 may classify these obstacles 20 in slightly different ways. In each of these examples, the terrain feature (e.g., the trench shown in FIGS. 2B-2D or the floating platform shown in FIGS. 2E-2G) corresponds to a negative obstacle 20. The robot 100 is capable of a stride length greater than a width w of the negative obstacle 20, and the width w of the negative obstacle 20 spans an area A large enough to receive a touchdown placement for a distal end 124 (e.g., a foot member) of a leg 120 of the robot 100. Thus, the robot 100 can either avoid (e.g., step over) the negative obstacle 20 or directly encounter the negative obstacle 20 (e.g., step into) by attempting to touch down a leg 120 (e.g., a distal end 124 of the leg 120) into the area A defining the negative obstacle 20.

Figure 2A:
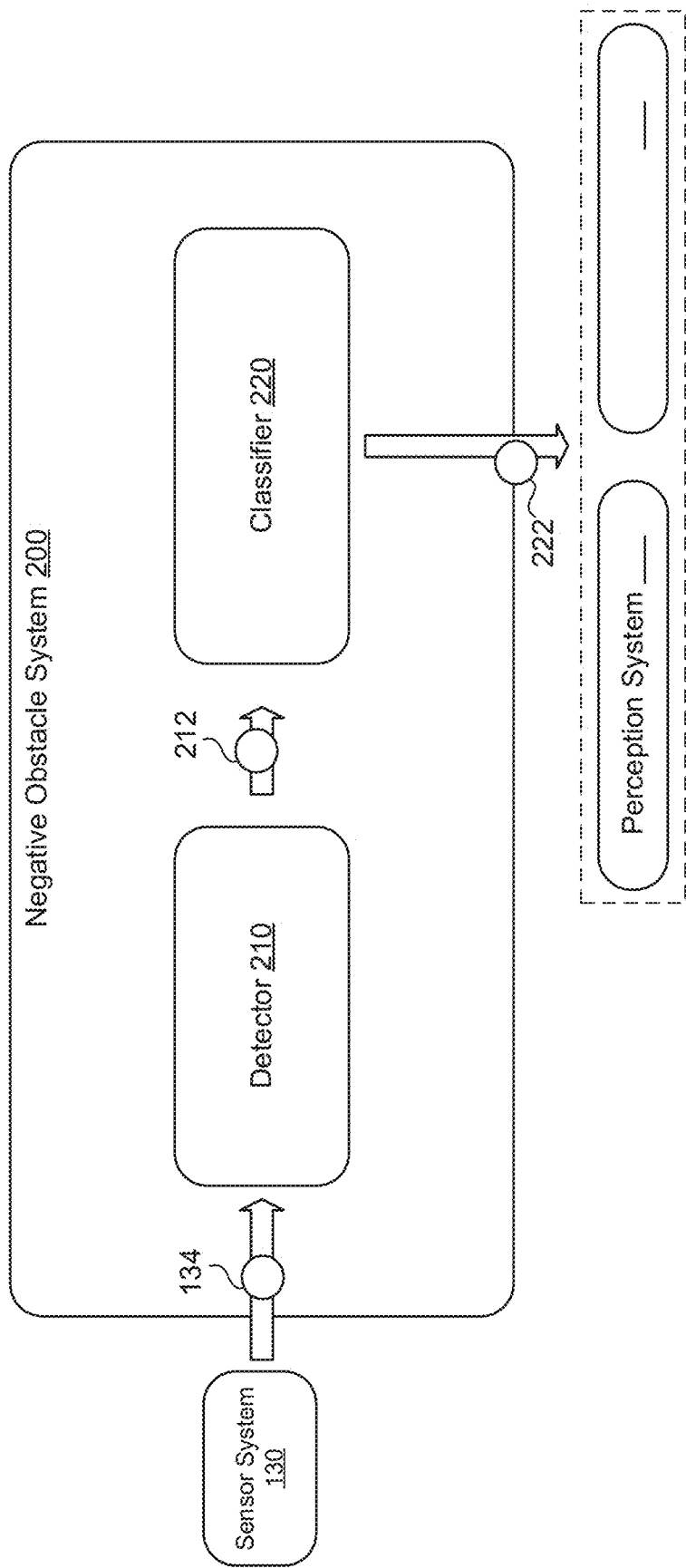
FIGS. 2A-2G are schematic views of example negative obstacle systems of the robot of FIG. 1A.
Figure 2B:
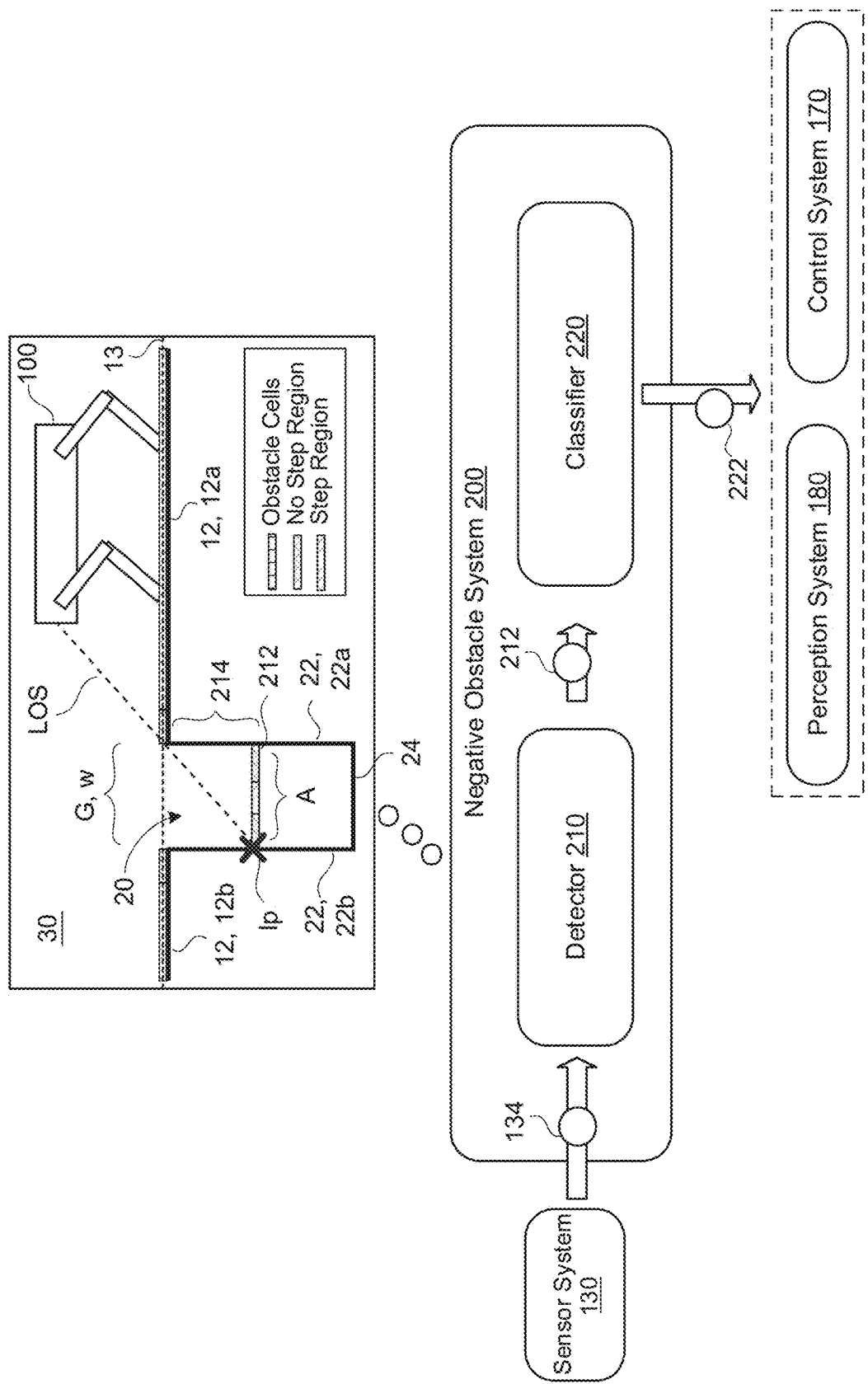
Figure 2C:
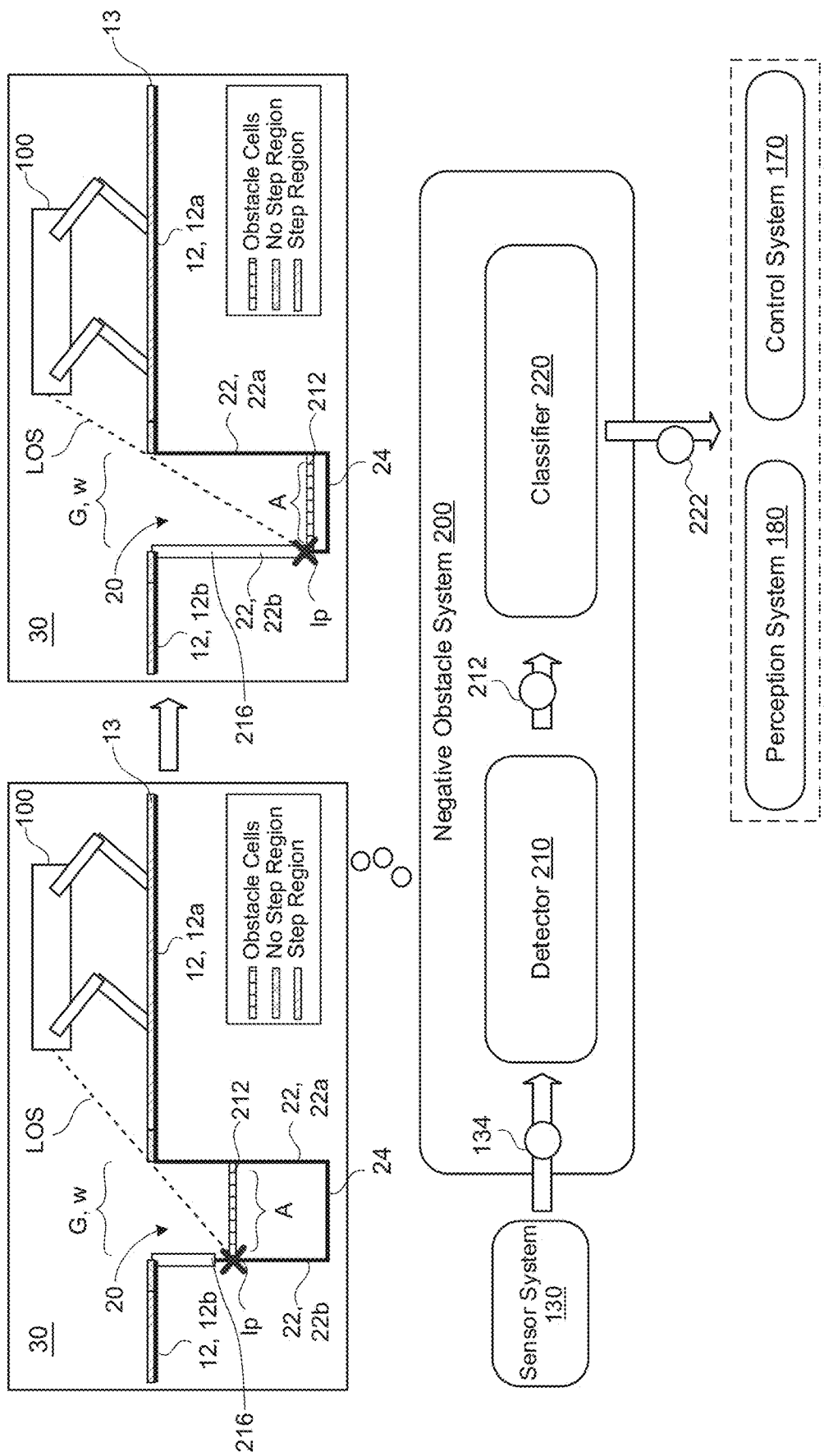
Figure 2D:
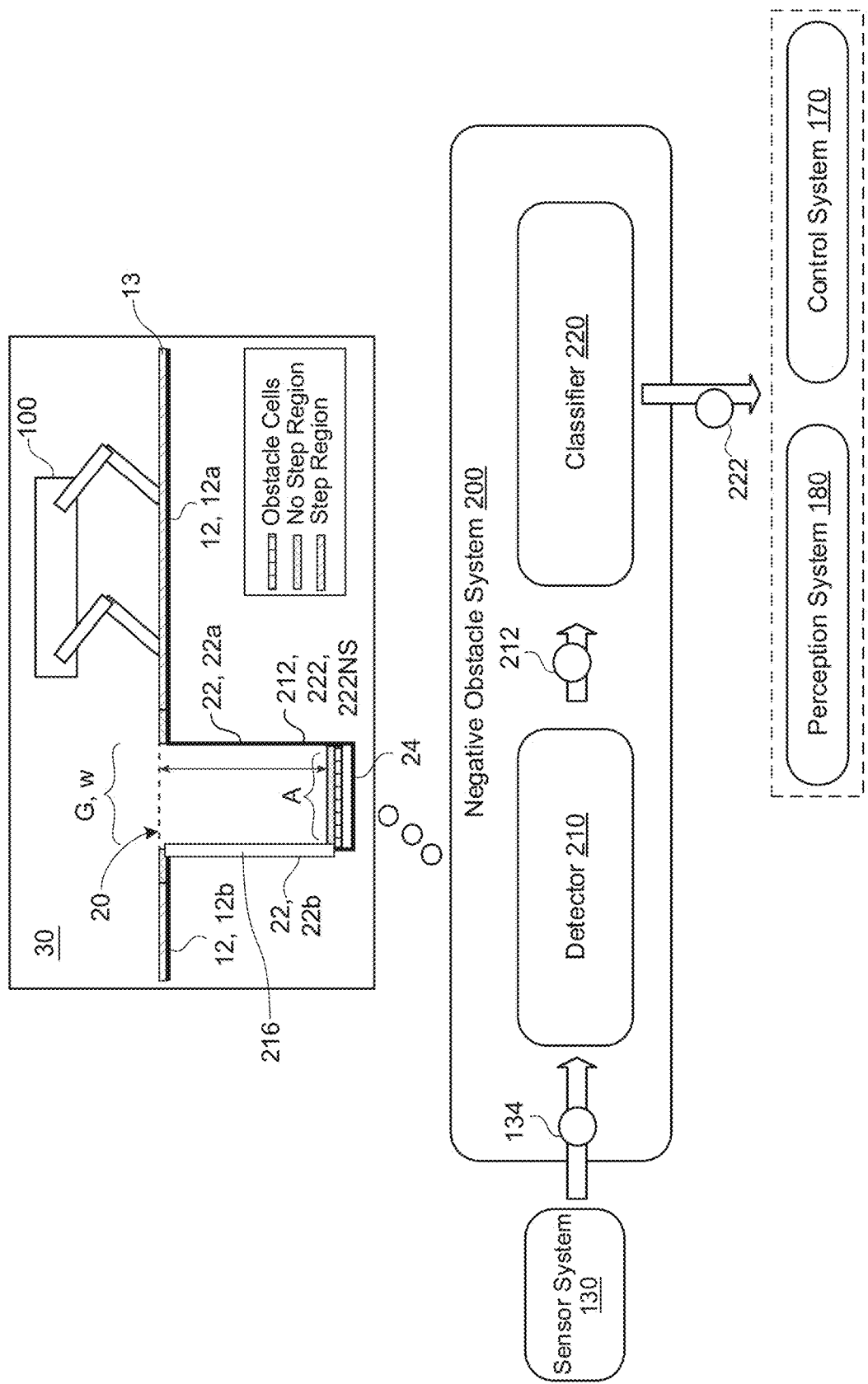

Referring to FIGS. 2B-2D, the negative obstacle 20 corresponds a trench. The trench is defined by a first wall 22, 22a disposed at a first end of the trench nearest the approaching robot 100, a second wall 22, 22b opposing the first wall 22a and disposed at a second end of the trench opposite the robot 100, and a ground 24, which may be at the bottom of the negative obstacle 20 like the illustrated trench, and may extend between the first and second walls 22a, 22b. Here, the trench corresponds to a gap G between a first portion 12a of the current support surface 12 (e.g., ground surface) 12 of the robot 100 and a second portion 12b of the current support surface 12 for the robot 100. In the illustrated example, the current support surface 12 defines a current plane 13 that extends across the trench from the first portion 12a of the current support surface 12 to the second portion 12b of the support surface 12 disposed on an opposite side of the trench than the robot 100. The skilled artisan will appreciate that the support surface 12 need not be perfectly planar, and the second portion 12b of the support surface 12 need not be at the same elevation as the first portion 12a of the support surface, for the robot to identify the negative obstacle, as long as the sensor system 134 is able to detect sufficient portions of the surfaces 12a, 12b to classify them step regions, and as long as any mismatch in elevations still allows the robot 100 to sense the wall 22b (FIGS. 2B-2D) or underground segments Su (FIGS. 2F-2G) on the far side of the negative obstacle 20. As the robot 100 approaches the trench moving across the current support surface 12 for the robot 100, the first wall 22a nearest the robot 100 occludes the sensor system 130 of the robot 100 from perceiving the actual ground 24 of the trench. Due to this occlusion, the sensor system 130 would only be able to generate sensor data 134 above a line of sight LOS for the sensor system 130. In this example, the LOS intersects the second wall 22b due to the occluding first wall 22a at an intersection point Ip (e.g., shown in FIG. 2B as an X at the end of the LOS). Sensor data 134 is missing (i.e., areas of missing terrain data) along the second wall 22b at elevations below the intersection point Ip toward the ground 24, but sensor data 134 exists along the second wall 22b at elevations above the intersection Ip towards the second portion 12b of the current support surface 12. As shown in FIG. 2B, some terrain mapping systems would assume that the intersection point Ip corresponds to a point where the ground of the trench meets the second wall 22b. Due to this incorrect assumption, a terrain mapping system may generate a step region (e.g., shown in diagonally hatched box) at an elevation higher than the actual ground 24 of the trench.

When the detector 210 determines that a terrain occlusion exists (e.g. by identifying a depth discontinuity 214), the detector 210 traces the line of sight LOS from a location of one or more sensors 132 for the robot 100 into the negative obstacle 20. In the examples shown, the robot 100 is designed such that one or more sensors 132 that capture sensor data 134 for the robot 100 are disposed on a front portion of the body 110 of the robot 100. In some implementations, the front portion of the body 110 corresponds to a portion of the body 110 that faces the negative obstacle 20 in a direction of travel for the robot 100, such that the sensors may be on a back portion of the body if the robot 100 is moving backwards. With a traced line of sight LOS, the detector 210 may determine whether the assumed bottom for the negative obstacle 20 is the actual ground 24 of the negative obstacle 20.

In some configurations, such as FIGS. 2B-2D, the detector 210 determines whether the intersection point Ip is near a column of voxels referred to as a voxel segment or voxel column 216. For instance, FIG. 2C illustrates the voxel column 216 as a white column along the second wall 22b extending from the second portion 12b of the current support surface 12 to the intersection point Ip. To determine whether the intersection point Ip is near a voxel segment or voxel column 216, the detector 210 uses a voxel map that constructs vertical segments to correspond to the presence of sensor data 134 in three dimensional space. For instance, the detector 210 queries the ground height map 182a with voxel segments to determine whether the intersection point Ip is at or near a voxel column 216. When the intersection point Ip is at or near a voxel column 216, this means that the intersection point Ip occurs at a vertical portion of the negative obstacle 20. In other words, the intersection point Ip occurs at a wall (e.g., the second wall 22b) rather than the actual ground 24 of the negative obstacle 20.

Referring to FIG. 2C, by assuming that the intersection point Ip occurs at a wall rather than the actual ground 24, the detector 210 performs a process that searches for the actual ground 24. In some examples, when the detector 210 determines that the intersection point Ip occurs at a wall rather than the actual ground 24, the detector 210 generates negative obstacle cells (e.g., shown in a vertically-hatched box with reference number 212 akin to a fake ground or bottom) spanning the occluded area A at a height corresponding to the intersection point Ip. These negative obstacle cells collectively may then be lowered until they approach the actual ground 24 of the negative obstacle 20. In some implementations, as the robot 100 continues to approach the first wall 22a, a field of view for the sensor system 130 for the robot 100 shown by the LOS continues to "see" deeper into the negative obstacle 20. For example, FIG. 2C depicts two images of the LOS where the first image on the left has a first LOS with a first intersection point Ip when the robot is at a first location relative to the negative obstacle 20 and the second image on the right has a second LOS with a second intersection point Ip when the robot is at a second location closer to the negative obstacle 20 than the first location. In the example shown, the first intersection point Ip is disposed at a higher elevation along the vertical portion (e.g., second wall 22b) of the negative obstacle than the second intersection point Ip. Here, the detector 210 continues to push down the collection of negative obstacle cells to follow the intersection point Ip such that the collection of negative obstacle cells are pushed down as indicated by the comparison between the depths of negative obstacle cells with reference number 212 in the left image and the right image of FIG. 2C. The detector 210 may cease pushing down the collection of negative obstacle cells when the intersection point Ip is no longer at or near a voxel column 216.

The classifier 220 is configured to receive a candidate support surface 212 and to generate a classification 222 for the area A of missing terrain data or occluded terrain data of the candidate support surface 212. Here, the classification 222 refers to whether the ground 24 of the negative obstacle 20 should be classified as a step region 222, 222S or a no-step region 222, 222NS. For instance, in some implementations, the classifier 220 receives the pushed down collection of negative obstacle cells and determines whether a height difference between the collection of negative obstacle cells and the current plane 13 defined by the support surface 12 for the robot 100 should result in the area A being classified as a no-step region 222NS or a step region 222S. Here, the classifier 220 may compare the height difference to a threshold height difference that corresponds to a step height for the robot 100. In this sense, if the height difference is less than a maximum step height for the robot 100, the negative obstacle 20 is not really an obstacle and the robot 100 may step into the area A without issue. Thus, where the height difference is less than the threshold height difference, the region of the negative obstacle may provisionally be classified as a step region 222S, at least until such time as the candidate support surface 212 is further pushed down to exceed the threshold height difference. In contrast, if the height difference is greater than the maximum step height for the robot 100, stepping into the negative obstacle 20 will causes potential issues for the robot 100. Referring to the example of FIG. 2D, the height difference between the collection of negative obstacle cells and the current plane 13 defined by the support surface 12 for the robot 100 causes the classifier 220 to classify the area A of missing terrain data as a no-step region 222NS. Thus, as the robot 100 approaches the negative obstacle 20, it continues to push down the perceived candidate support surface 212 until such time as either the actual bottom or ground 24 is perceived (see also active gaze control discussion below), or the candidate support surface 212 is deep enough that it is classified as a no-step region NS. Either way, the robot will not step in the negative obstacle 20 if the height difference between the current plane 13 of the support surface 12 and either the candidate support surface 212 (if the actual bottom or ground 24 is not perceived) or the actual ground 24 (if perceived) is greater than the threshold maximum step height for the robot 100.

In some implementations, the negative obstacle system 200 may function more broadly as a general obstacle system or work in conjunction with another system of the robot 100 that identifies/classifies positive obstacles. When the negative obstacle system 200 functions as a more general obstacle system, the negative obstacle system 200 may be configured to classify portions of the terrain based on a classification 222 for a negative obstacle 20. For instance, when the classifier 220 classifies the area A formed by the missing terrain data as a no-step region 222NS, the classifier 220 may additionally determine if a second area and/or a third area should also be classified as no-step regions 222NS. Here, the second area corresponds to an area located on the current surface 12 supporting the robot 100 immediately adjacent the first wall 22a of the negative obstacle 20 while the third area corresponds to an area located on the second portion 12b of the current support surface 12 immediately adjacent the second wall 22b of the negative obstacle

20. It may be advantageous to classify either of the second area or the third area, or both as no-step regions 222NS when the area A of missing terrain data is a no-step region 222NS. This is because if the robot 100 touches down a distal end 124 of a leg 120 in either of these areas (e.g., the second area or the third area), the robot 100 may risk the leg 120 slipping into the no-step region 222NS of the negative obstacle 20. In configurations of the robot 100 where another system classifies positive obstacles for the robot 100, the negative obstacle system 200 may inform the other system of a classification 222 of a negative obstacle 20 and that other system, in turn, classifies areas or refines its classifications of areas (e.g., an area such as the second area and/or third area) as step/no step regions based on the negative obstacle classification 222. Thus, if a negative obstacle 20 is classified as a no-step region 222NS, the broader control system 170 may also classify adjacent regions as no-step regions 222NS so that the robot 100 gives the negative obstacle 20 a wide berth.

As shown in FIG. 2B compared to FIG. 2D, the classifier 220 may classify the area A of missing terrain data as a classification 222 that is different from another system's classification. For instance, the perception system 180 may initially classify the area A as a step region, for example, based on a shallow initial LOS, but then the classifier 220 determines that the area A corresponds to a negative obstacle 20 or determines the candidate support surface 212 is deeper than the threshold step height, and should instead be classified as a no-step region 222NS. The classifier 220 is therefore able to reclassify a prior classification.

Figure 2E:
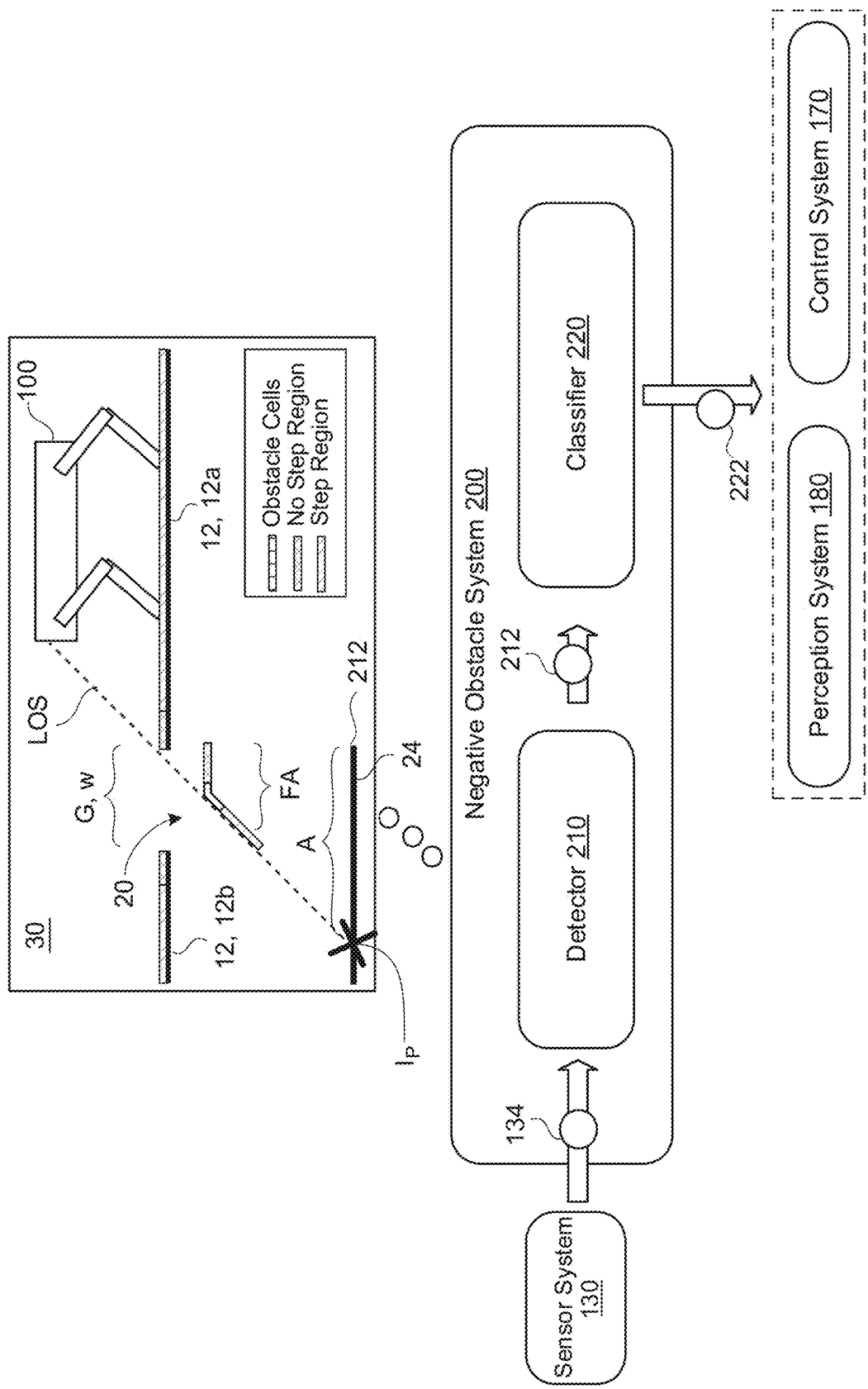
Figure 2F:
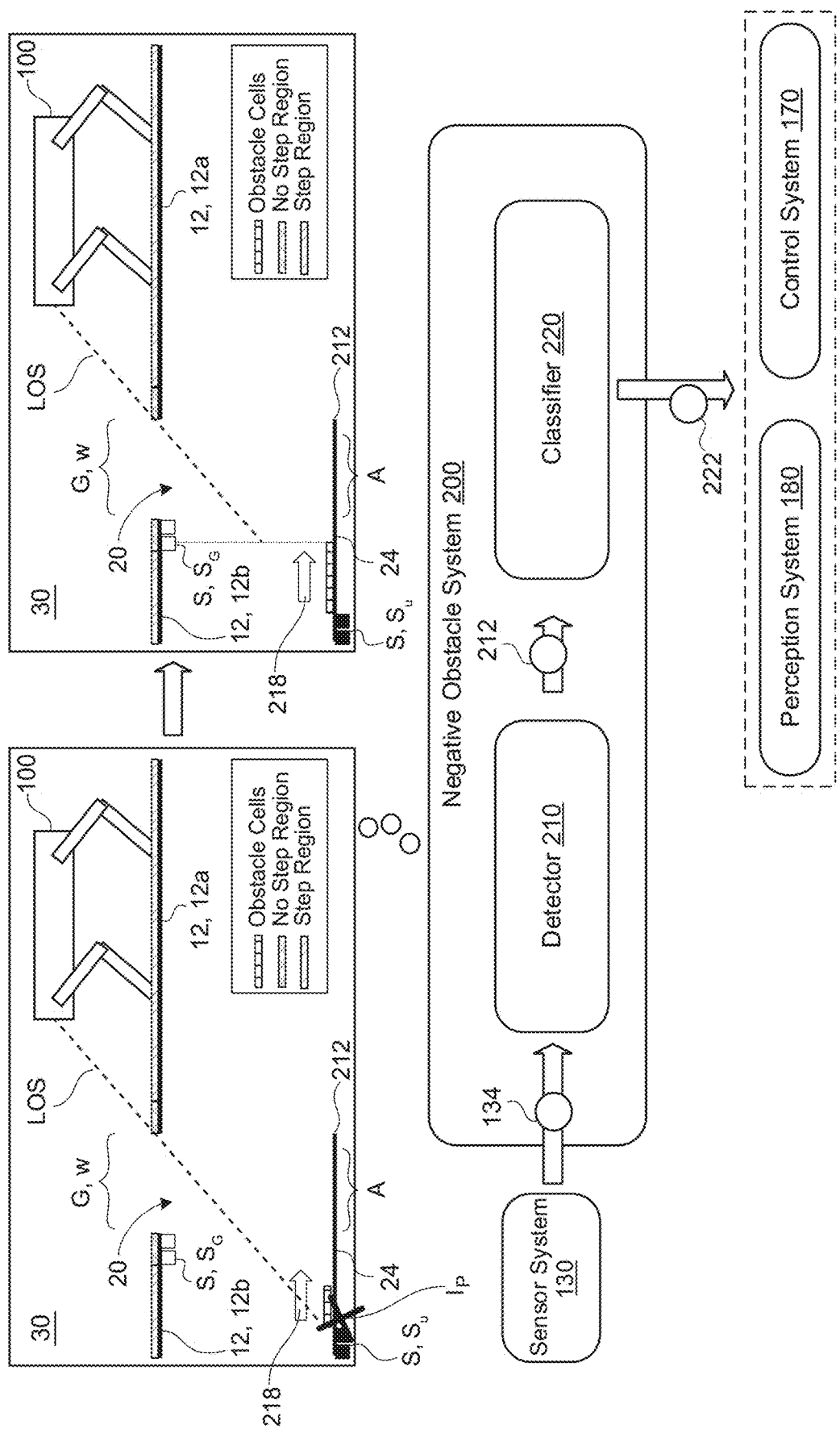
Figure 2G:
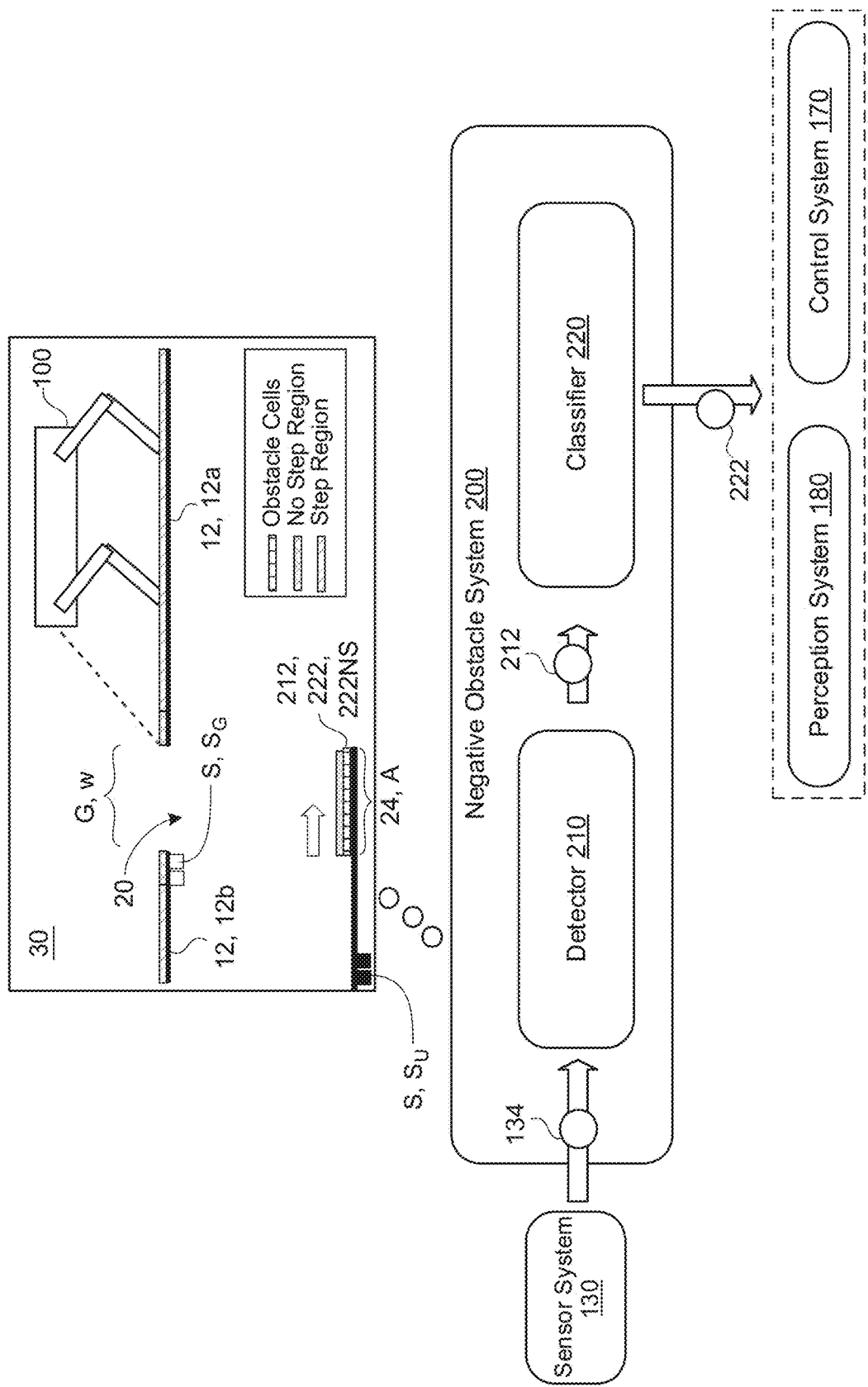

FIGS. 2E-2G illustrate a negative obstacle 20 that corresponds to a platform gap (also called a floating platform). A platform gap differs from some negative obstacles 20 because the candidate support surface 212 is not bound by a near wall (i.e., a wall near the robot) and a far wall (i.e., a wall opposite the robot). Rather, the LOS for the robot 100 does not see any far wall, but instead sees the actual bottom 24 of the negative obstacle 20 underneath another support surface (e.g., underneath the second portion 12b of the current support surface 12). In other words, the other support surface such as the second portion 12b of the current support surface 12 appears to the robot 100 to resemble a floating platform with ground underneath it. As shown by FIG. 2E, this type of negative obstacle 20 without the negative obstacle system 200 may cause the robot 100 to infer that some area exists in the occluded area beneath the LOS (e.g., shown as the false area FA), when, in reality, no such area exists. This type of negative obstacle 20 can lead a robot 100 to falsely assume that a sloped terrain section exists in the occluded area.

FIG. 2F depicts that when the robot 100 approaches a platform gap occurrence while traversing the environment 30, underground segments S, Su from the candidate support surface 212 appear adjacent to or overlapping with ground segments S, SG associated with the second portion 12b of the current support surface 12 for the robot 100. Therefore, instead of determining whether an intersection point Ip from the LOS occurs at or near a voxel segment, the detector 210 identifies whether the intersection point Ip of the LOS occurs beneath a previously identified ground segment SG. The detector 210 then constructs the occluded area A by generating negative obstacle cells spanning an area from the occluding edge of the current support surface 12 to a location where ground segments SG do not occur overhead. For instance, FIG. 2F depicts an arrow 218 to illustrate a direction of a search process for the occluded area A. Moreover, comparing FIG. 2F with FIG. 2G, the resulting area A of missing terrain data does not include any overhead ground segments SG from the second portion 12b of the current support surface 12. With the resulting area A, the classifier 220 may then determine whether the area A should be classified as a no-step region 222NS. In FIG. 2G, the classifier 220 designates the area A as a no-step region 222NS. In some examples, similar to the classification 222 of the area A of the candidate support surface 212 for the trench example of FIGS. 2B-2D, the classifier 220 determines whether a height difference between the collection of negative obstacle cells and the current support surface 12 for the robot 100 should result in the area A being classified as a no-step region 222NS (e.g., shown in a grey cross-hatched box) or a step region 222S (e.g., shown in a diagonally-hatched box of the current support surface 12). Here, the classifier 220 may compare the height difference to a threshold height difference that corresponds to a step height for the robot 100. In this sense, if the height difference is less than a maximum step height for the robot 100, the negative obstacle 20 is not really an obstacle and the robot 100 may step into the area A without issue. In contrast, if the height difference is greater than the maximum step height for the robot 100, stepping into the negative obstacle 20 (i.e., the platform gap) will causes potential issues for the robot 100. It should be noted that for purposes of classification, the robot 10 may assume that the height of the area A is the same as that of the directly sensed underground segments S, Su adjacent to the area A. For classifying as a step region 222S, the robot may directly sense the ground in initially occluded area A as it approaches the negative obstacle, for example aided by active gaze control as described below.

As the robot 100 approaches a negative obstacle 20, the robot 100 may be traveling at a commanded velocity (e.g., from a command by an operator of the robot 100 or from a command by a remote controller for the robot 100) and/or at a designated gait pattern. Here, the techniques of the negative obstacle system 200 function without the robot 100 needing to pitch or otherwise adjust its body 110 or sensors 132 to account for the negative obstacle 20, without adjusting the orientation or field of view $F_V$ of the sensor(s) 132 detecting the negative obstacle 20. In this regard, the robot 100 may continue traveling without hesitation as the robot 100 approaches and traverses the negative obstacle 20. This also means that the robot 100 does not need to perform any specialty behavior to aid the negative obstacle system 200. The sensors' fields of view $F_V$ can remain unchanged (without shifting of focal length, zooming in or out, etc.) while still perceiving and classifying the negative obstacle 20 during normal motion. In other embodiments, the sensors' fields of view $F_V$ can be adjusted during the movement and classification.

Additionally or alternatively, the robot 100 may approach a negative obstacle 20 and perform active gaze control to intentionally change the pose of the robot 100 to perceive the negative obstacle 20. In some configurations, when performing active gaze control, the robot 100 may intentionally pitch the body 110 of the robot 100 down towards the negative obstacle 20 to aid the negative obstacle system 200 and/or the perception system 180. For instance, if the robot 100 is traveling forwards with a front portion of the body 110 being the first part of the body 110 to encounter the negative obstacle 20, the robot 100 may change the pitch of the body 110 such that the front portion of the body 110 decreases its height from the current surface 12 supporting the robot 100. In other examples, the body 110 may pitch such that the front portion of the body 110 increases its height from the current surface 12 supporting the robot 100. In contrast, if the robot 100 was traveling backwards with a rear portion of the body 110 being the first part of the body 110 to encounter the negative obstacle 20, the robot 100 may change the pitch of the rear portion of the body 110 in a similar manner to when the robot 100 is traveling forwards. The pitch adjustment may reorient one or more sensors(s) 132 and enable the field of view $F_V$ for one or more sensor(s) 132 of the sensor system 130 to perceive or to collect sensor data 134 for the negative obstacle 20. For example, by pitching the body 110, the robot 100 collects new or additional sensor data 134 for an area with a cluster of missing terrain data. In some implementations, the active gaze control occurs when one or more systems of the robot 100 identify the presence of missing terrain data adjacent the robot 100. For example, the negative obstacle system 200 identifies that a map 182 of the perception system 180 lacks sensor data 134 for a particular region adjacent the robot 100 (e.g., within 3 to 5 meters from the robot 100) and the control system 170 may change the pose of the robot 100 from an initial pose to an active gaze pose. Here, the active gaze pose refers to a pose that enables one or more sensor 132 to gather additional sensor data 134 (e.g., sensor data 134 at a different viewing angle) than the sensor data 134 that would normally be gathered by one or more sensor(s) 132 of the robot 100 while the robot 100 was in the initial pose.

Figure 3:
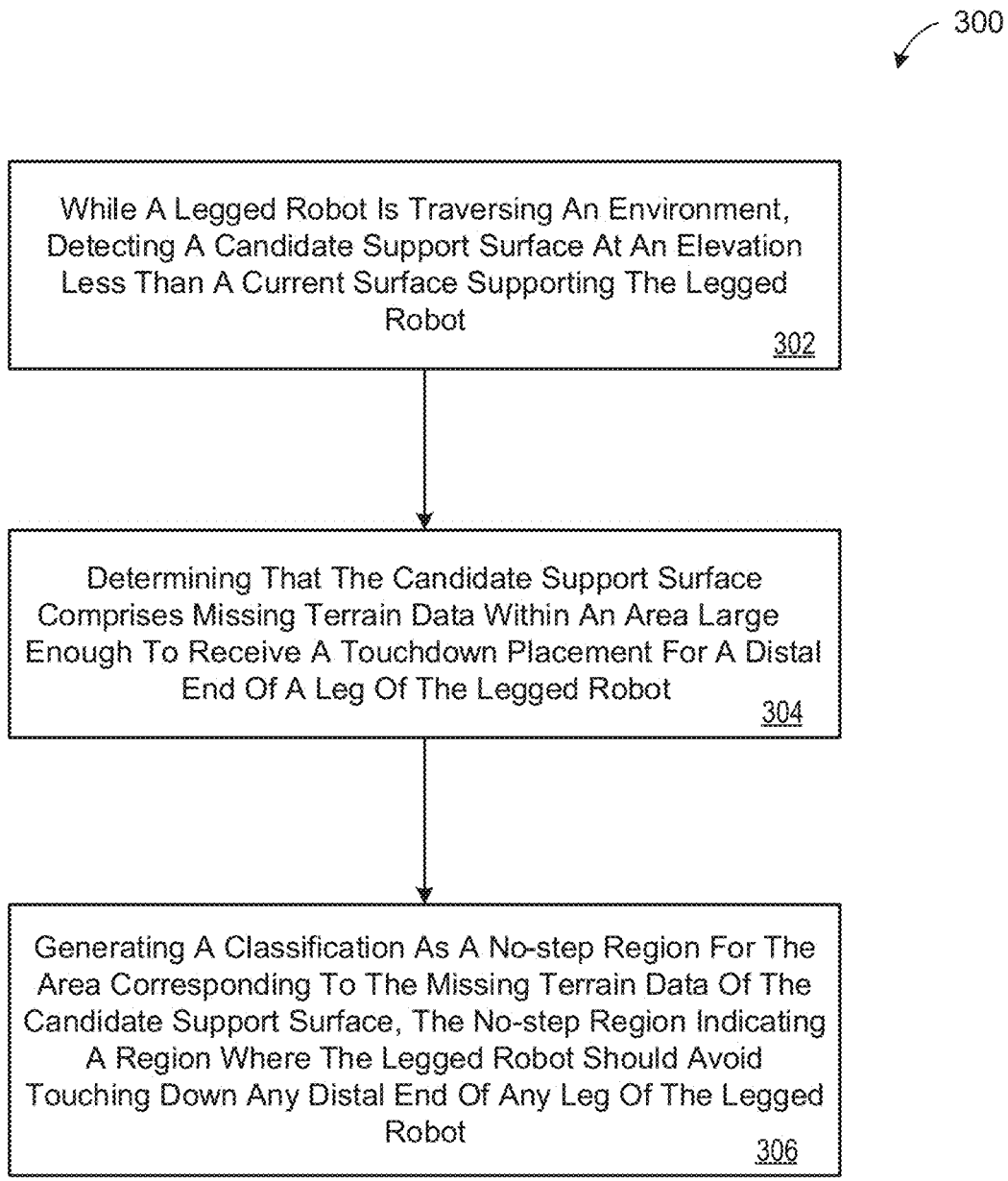
FIG. 3 is a flow chart of an example arrangement of operations for a method of performing negative obstacle detection.

FIG. 3 is a flowchart of an example arrangement of operations for a method 300 of generating a classification 222 for a negative obstacle 20. At operation 302, while the legged robot 100 traverses the environment 30, the method 300 detects a candidate support surface 212 at an elevation less than a current surface 12 supporting a legged robot 100. At operation 304, the method 300 determines that the candidate support surface 212 comprises missing terrain data corresponding to an area A large enough to receive a touchdown placement for a distal end 124 of a leg 120 of the legged robot 100. At operation 306, the method 300 generates a classification 222 as a no-step region 222NS for the area A of missing terrain data of the candidate support surface 212. The no step region 222NS (e.g., shown in a grey cross-hatched box) indicates a region where the legged robot 100 should avoid touching down any distal end 124 of any leg 120 of the legged robot 100.

Figure 4:
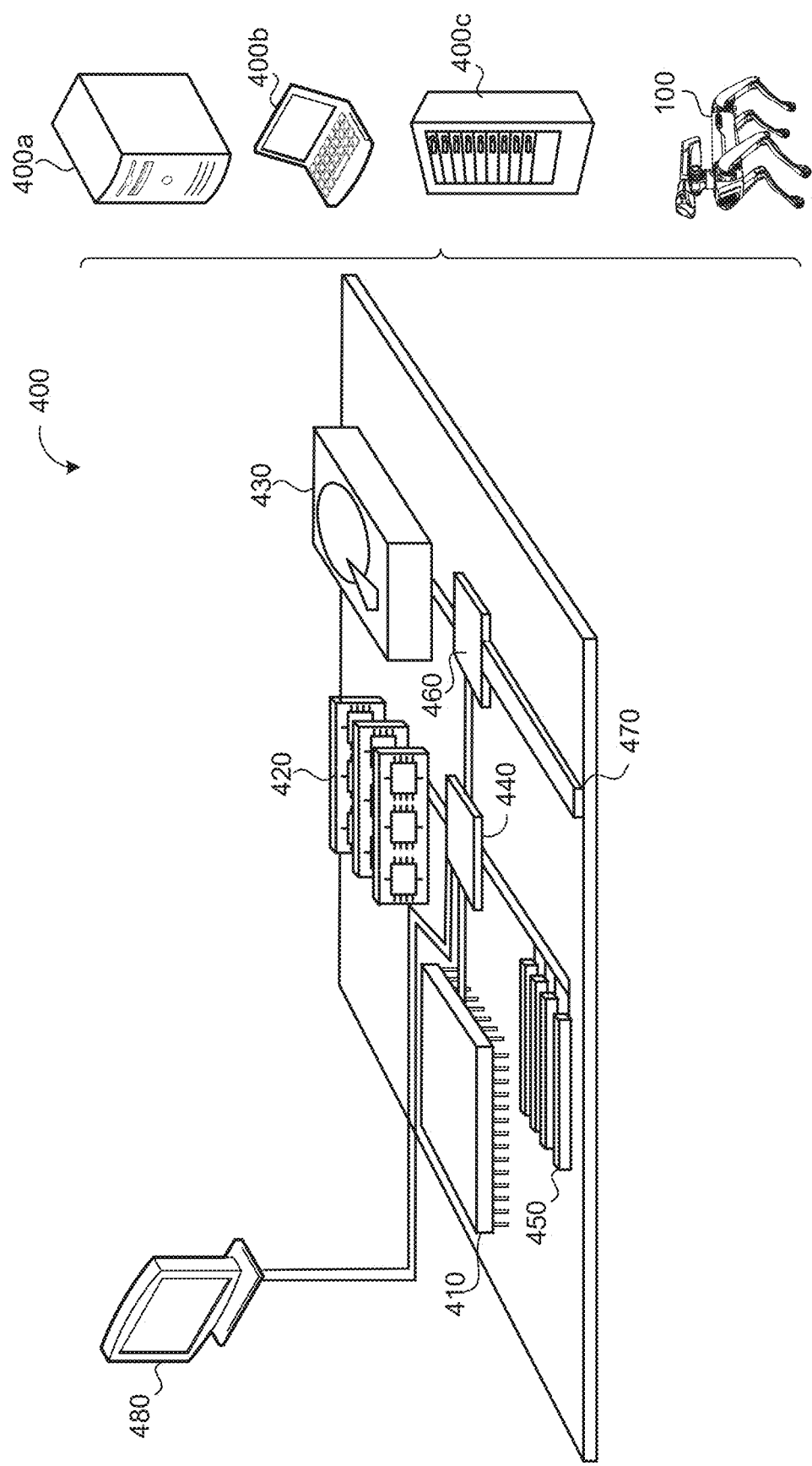
FIG. 4 is a schematic view of an example computing device that may be used to implement the systems and methods described herein.

FIG. 4 is a schematic view of an example computing device 400 that may be used to implement the systems (e.g., the robot 100, the sensor system 130, the computing system 140, the remote system 160, the control system 170, the perception system 180, and/or the negative obstacle system 200, see FIG. 1B) and methods (e.g., the method 300, see FIG. 3) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware 142, 162), memory 420 (e.g., memory hardware 144, 164), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 440, which may accept various expansion cards (not shown). In some implementations, the low-speed controller 460 is coupled to the storage device 430 and a low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, as part of a rack server system 400c, as part of the robot 100, or as part of a remote control for operating the robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   identifying a first elevation value for a first elevation of a first portion of an environment that depends at least in part on an orientation of a sensor of a legged robot with respect to the first portion of the environment;
   determining, based on sensor data from the sensor, that the first elevation value is less than a second elevation value for a second elevation of a second portion of the environment supporting the legged robot;
   determining that at least a subset of the first portion of the environment is occluded from the sensor;
   classifying the first portion of the environment as a no-step region indicating a region to avoid touching down a distal end of a leg of the legged robot in response to determining that the first elevation value is less than the second elevation value and determining that the at least a subset of the first portion of the environment is occluded from the sensor; and
   instructing movement by the legged robot based on classifying the first portion of the environment as the no-step region.

2. The method of claim 1, wherein determining that the first elevation value is less than the second elevation value is based on an output of a terrain mapping system of the legged robot.

3. The method of claim 1, wherein classifying the first portion of the environment as the no-step region comprises:
   re-classifying the first portion of the environment from a step region to the no-step region.

4. The method of claim 1, wherein the first portion of the environment corresponds to a gap in the environment, wherein the operations further comprise:
   classifying a third portion of the environment adjacent to the gap as the no-step region.

5. The method of claim 1, wherein determining that the first elevation value is less than the second elevation value comprises:
   determining that the first portion of the environment corresponds to a gap in the environment, wherein the gap extends from a first position in the environment that is adjacent the legged robot to a second position in the environment.

6. The method of claim 5, wherein the operations further comprise:
   classifying a third portion of the environment adjacent to the first position as the no-step region; and
   classifying a fourth portion of the environment adjacent to the second position as the no-step region.

7. The method of claim 1, wherein determining that the first elevation value is less than the second elevation value comprises:
determining that the first portion of the environment corresponds to a gap in the environment, wherein the gap corresponds to a width that is less than a stride length of the legged robot.

8. The method of claim 1, wherein instructing movement by the legged robot comprises:
instructing the legged robot to move using four legs of the legged robot, the four legs coupled to a body of the legged robot.

9. The method of claim 1, wherein determining that the at least a subset of the first portion of the environment is occluded from the sensor comprises:
determining that the sensor data does not include sensor data associated with the at least a subset of the first portion of the environment.

10. The method of claim 1, wherein identifying the first elevation value comprises:
identifying the first elevation value that is different from a third elevation value for a third elevation of a ground surface associated with the first portion of the environment.

11. The method of claim 1, wherein the operations further comprise:
obtaining the sensor data from the sensor as disposed on a front end portion of a body of the legged robot.

12. The method of claim 1, wherein the operations further comprise:
obtaining the sensor data from the sensor as disposed on a rear end portion of a body of the legged robot.

13. The method of claim 1, wherein the operations further comprise:
obtaining the sensor data as the legged robot traverses the environment at a particular speed or gait.

14. The method of claim 1, wherein instructing movement by the legged robot comprises:
providing instructions to the legged robot; and
executing, by the legged robot, the instructions, wherein the legged robot moves the distal end of the leg from the second portion of the environment to a third portion of the environment based on executing the instructions.

15. A robot comprising:
a body;
two or more legs coupled to the body;
a sensor; and
an obstacle detection system comprising data processing hardware and memory hardware in communication with the data processing hardware, the memory hardware storing instructions that when executed on the data processing hardware cause the data processing hardware to:
identify a first elevation value for a first elevation of a first portion of an environment that depends at least in part on an orientation of the sensor with respect to the first portion of the environment;
determine, based on sensor data from the sensor, that the first elevation value is less than a second elevation value for a second elevation of a second portion of the environment supporting at least one of the two or more legs;
determine that at least a subset of the first portion of the environment is occluded from the sensor;
classify the first portion of the environment as a no-step region indicating a region to avoid touching down a distal end of a leg of the two or more legs of the robot in response to determining that the first elevation value is less than the second elevation value and determining that the at least a subset of the first portion of the environment is occluded from the sensor; and
instruct movement by the robot based on classifying the first portion of the environment as the no-step region.

16. The robot of claim 15, wherein determining that the first elevation value is less than the second elevation value is based on an output of a terrain mapping system of the robot.

17. The robot of claim 15, wherein to classify the first portion of the environment as the no-step region, execution of the instructions on the data processing hardware further causes the data processing hardware to:
reclassify the first portion of the environment from a step region to the no-step region.

18. The robot of claim 15, wherein the first portion of the environment corresponds to a gap in the environment, wherein execution of the instructions on the data processing hardware further causes the data processing hardware to:
classify a third portion of the environment adjacent to the gap as the no-step region.

19. The robot of claim 15, wherein: the first portion of the environment corresponds to a gap in the environment that extends from a first position in the environment that is adjacent the robot to a second position in the environment.

20. The robot of claim 19, wherein execution of the instructions on the data processing hardware further causes the data processing hardware to:
classify a third portion of the environment adjacent to the first position as the no-step region; and
classify a fourth portion of the environment adjacent to the second position as the no-step region.

21. The robot of claim 15, wherein the first portion of the environment corresponds to a gap in the environment, wherein the gap corresponds to a width that is less than a stride length of the robot.

22. The robot of claim 15, wherein the two or more legs comprise four legs.

23. The robot of claim 15, wherein to determine that the at least a subset of the first portion of the environment is occluded from the sensor, execution of the instructions on the data processing hardware further causes the data processing hardware to:
determine that the sensor data does not include sensor data associated with the at least a subset of the first portion of the environment.

24. The robot of claim 15, wherein a third elevation value for a third elevation of a ground surface associated with the first portion of the environment is different from the first elevation value and the second elevation value.

25. The robot of claim 15, wherein the sensor is disposed on a front end portion of the body.

26. The robot of claim 15, wherein the sensor is disposed on a rear end portion of the body.

27. The robot of claim 15, wherein the robot traverses the environment at a particular speed or gait.

28. The robot of claim 15, wherein to instruct movement by the robot, execution of the instructions on the data processing hardware further causes the data processing hardware to:
provide a set of instructions to the robot; and
execute, by the robot, the set of instructions, wherein the robot moves the distal end of the leg from the second portion of the environment to a third portion of the environment based on executing the instructions.

* * * * *